(12) United States Patent
Tyson-Quah

(10) Patent No.: US 7,822,663 B2
(45) Date of Patent: Oct. 26, 2010

(54) REDUCING RISK IN A PAYMENT-BASED TRANSACTION BY RETURNING PAYMENT AUTHORIZING INSTRUCTIONS TO A PAYMENT QUEUE FOR LATERT RE-EVALUATION

(76) Inventor: Kathleen Tyson-Quah, 1 Canons Close, Radlett, Herts WD7 7ER (GB)

( * ) Notice: Subject to any disclaimer, the term of this patent is extended or adjusted under 35 U.S.C. 154(b) by 1604 days.

(21) Appl. No.: 10/814,800

(22) Filed: Mar. 31, 2004

(65) Prior Publication Data
US 2004/0236677 A1 Nov. 25, 2004

Related U.S. Application Data

(63) Continuation of application No. 09/513,440, filed on Feb. 25, 2000, now Pat. No. 7,283,977.

(51) Int. Cl.
*G06Q 40/00* (2006.01)
(52) U.S. Cl. .......................................... 705/35; 705/30
(58) Field of Classification Search .............. 705/10–44
See application file for complete search history.

(56) References Cited

U.S. PATENT DOCUMENTS 5,652,786 A * 7/1997 Rogers .................... 379/91.01
5,659,116 A 8/1997 McCoy et al.

(Continued)

FOREIGN PATENT DOCUMENTS

WO WO 99/05633 2/1999

OTHER PUBLICATIONS

Hollis, "Managing payment system risk: to keep financial protection unbroken, coordinate safety plans with banks", Corporate Cashflow Magazine, v13, n10, p. 28(50, Sep. 1992, Dialog file 148, Accession No. 06213056.*

(Continued)

*Primary Examiner*—Frantzy Poinvil
(74) *Attorney, Agent, or Firm*—Perkins Coie LLP

(57) ABSTRACT

A real-time, global system and method for controlling payments risk, liquidity risk and systemic risk arising between financial counterparties active in payments-based transactions. The system comprises: a plurality of User Host Applications for use by plurality of Users; a plurality of Third Party Host Applications for use by plurality of Third Parties; and a plurality of Payment Bank Host Applications for use by a plurality of Payment Banks operating a plurality of domestic payment systems. All host applications communicate via cryptographically secure sessions via private communications networks and/or the Internet global computer network. User and Payment Bank access is secured by digital certification. Each Payment Bank Host Application has a mechanism for processing payment messages, including payments instructions to be carried out in its domestic payments system on behalf of a plurality of account holders (including bank correspondents). In addition, each Payment Bank Host Application includes a filter process module for processing payments instructions, prior to being carried out by the domestic payment system. In the event of a counterparty payment failure or insolvency, the Filter Process Module enables instantaneous, automated suspension of all further payments to the counterparty in a multiplicity of chosen currencies. The reduction in payments risk and liquidity risk to predetermined tolerances reduces the likelihood of contingent defaults in the event of payment failure due to bank insolvency or other unforeseen event, and thereby reduces systemic risk to the global financial system.

34 Claims, 20 Drawing Sheets

U.S. PATENT DOCUMENTS

| | | | |
|---|---|---|---|
| 5,717,989 A | 2/1998 | Tozzoli et al. | |
| 5,783,808 A | 7/1998 | Josephson | |
| 5,956,695 A * | 9/1999 | Carrithers et al. | 705/14 |
| 5,978,485 A | 11/1999 | Rosen | |
| 6,021,202 A * | 2/2000 | Anderson et al. | 705/54 |
| 6,076,074 A | 6/2000 | Cotton et al. | |
| 6,088,686 A | 7/2000 | Walker et al. | |
| 6,122,625 A | 9/2000 | Rosen | |
| 6,348,935 B1 | 2/2002 | Malacinski et al. | |
| 6,493,680 B2 | 12/2002 | Logan et al. | |
| 7,031,939 B1 * | 4/2006 | Gallagher et al. | 705/39 |
| 7,177,830 B2 * | 2/2007 | Shields et al. | 705/35 |
| 7,346,575 B1 * | 3/2008 | Ahles et al. | 705/38 |

OTHER PUBLICATIONS

Web-based product brochure for "FXNET™", www.fxnet.com, pp. 1-4.

Web-based publication for CLS Services Ltd., www.cls-services.com, 1 page.

Web-based publication entitled "Best Practices For Credit Risk Disclosure" by Basel Committee Publications, Sep. 2000, No. 74, www.bis.org, pp. 1-2.

Scientific publication entitled "The World Currencies And Their Payment Systems" by Jim Ford, Credit Suisse/First Boston, Sep. 2000, pp. 1-51.

Web-based publication entitled "Request for Proposals—Direct Access to *Nostro* Account Information" by Ian Robertson and Alan Macfarlane, www.opengroup.org, Jun. 18, 1999, p. 1-2.

Product brochure for NIMBUS Payment Scheduling and Liquidity Management Solution, by Mercator Software, pp. 1-2.

Scientific publication entitled "An Introduction To Continuous Linked Settlement" by CLS Services Ltd., Sep. 1998, pp. 1-37.

* cited by examiner

Prior Art FX Settlement Process

Fig. 1

| Trade Date | Settlement Date | Reconciliation Date |
|---|---|---|
| • Parties transact a series of transactions in various currency pairs | • Branch or nostro constructs payment queue | • MT950s from all branches and nostros reconciled to match payment and counterpayment (receipt) settlement of transactions |
| • Parties send confirmations of each trade MT300 | • Branch or nostro releases payments as liquidity in local payment system allows | • Exception report of failed settlements generated |
| • Parties match MT300s to create a confirmed trade | • Branch or nostro sends MT900 to confirm payments | • Failed settlements queried with counterparties |
| • Parties instruct payment of sold currency leg for each trade | • Branch or nostro sends MT910 to confirm receipts | • Decisions on default/payment suspension taken after investigation |
| • Parties pre-advice receipt of bought currency leg for each trade | • Branch or nostro sends MT950 daily statement of account activity | • Payments at branches and nostros cancelled on a "best efforts" basis |

Fig. 2 – Prior Art

Risk

PAYMENT RISK = The risk of losing the amount of payment in the event of failed counterpayment (non-receipt)

LIQUIDITY RISK = The cost or penalty associated with unanticipated receipt shortfalls

SYSTEMIC RISK = Risk associated with the general health or structure of the financial system as a result of inability to cope with a financial default or liquidity shock

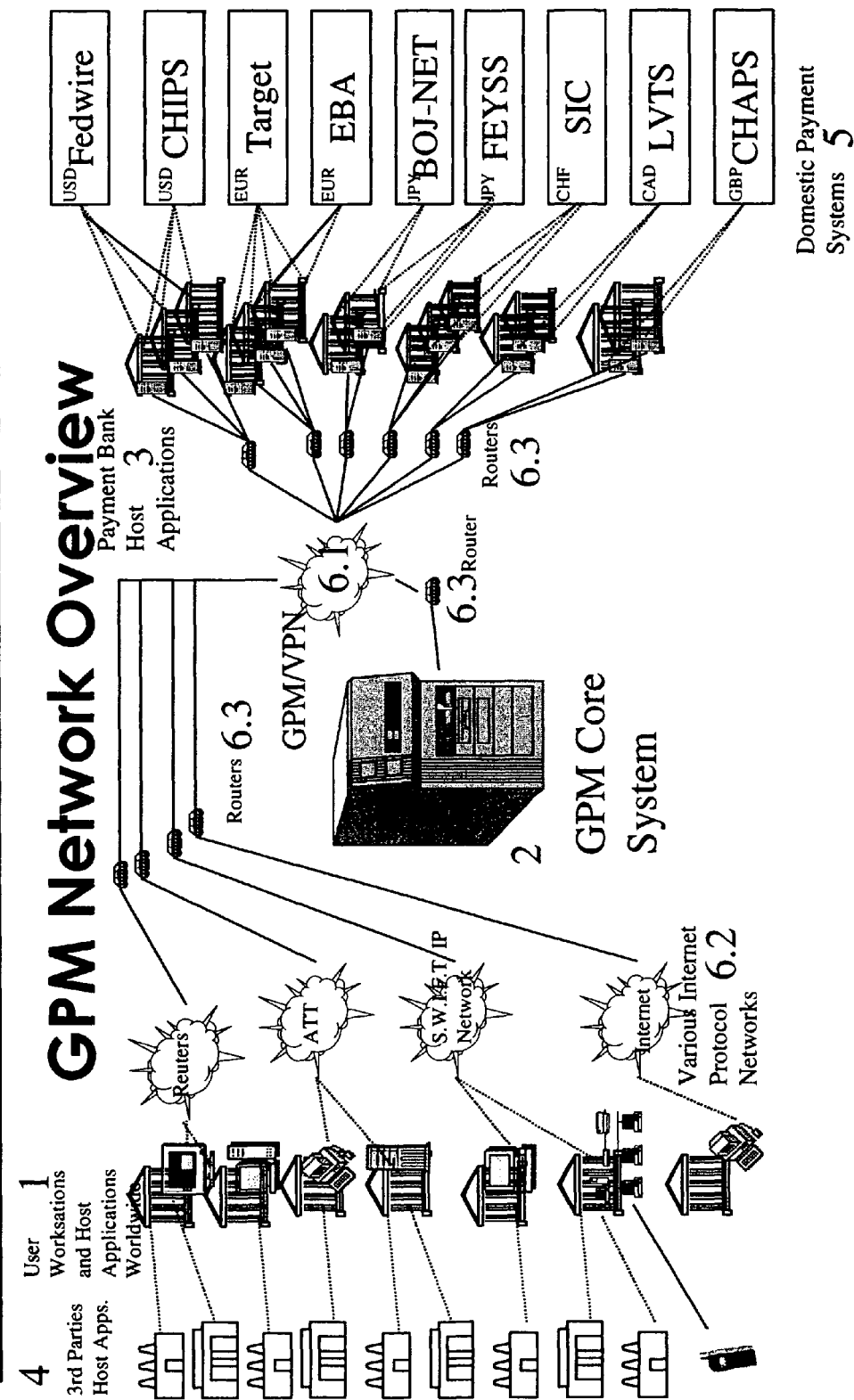

Fig. 6

GPM FX Settlement Process

Trade Date

- Parties transact a series of transactions in various currency pairs
- Parties send confirmations of each trade MT300
- Parties match MT300s to create a confirmed trade
- Parties instruct payment of sold currency leg for each trade to Payment Bank
- Parties pre-advice receipt of bought currency leg for each trade
- Parties advise GPM Payment Banks of Risk Parameters

Settlement Date

- Payment Bank constructs payment queue
- Payment Bank Host Application releases payments through GPM Filter Process
- Payment Bank sends MT900 to confirm payments and MT910 to confirm receipts
- Payment Bank Host App. notifies sustained imbalance as observed
- Exception queries, Suspend Process and liquidity management decisions taken intraday
- Payment Bank sends MT950 daily statement of account activity

Reconciliation Date

- MT950s from all branches and nostros reconciled to determine settlement of transactions
- Follow-up on individual failed settlements / defaults

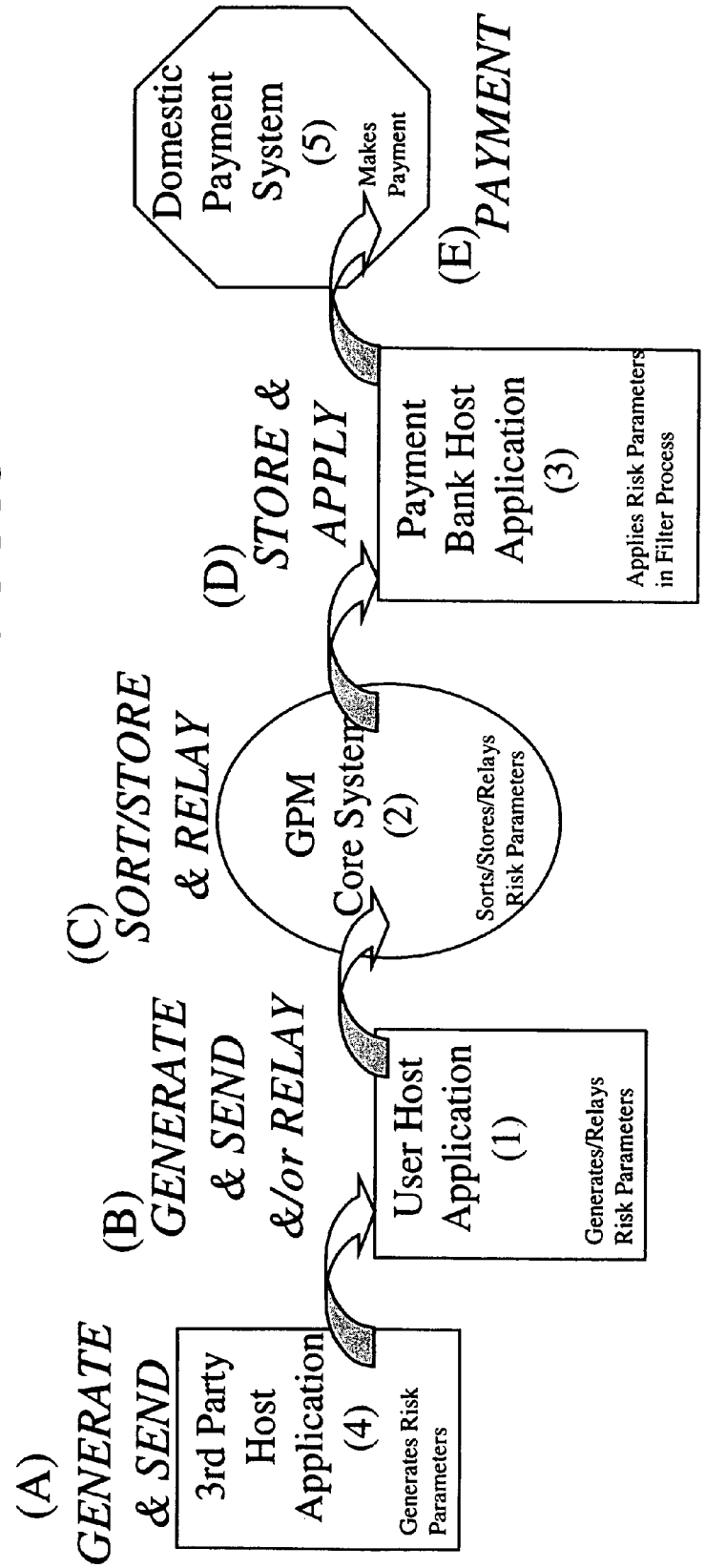
Fig. 9A1 Risk Parameter Instruction Process

Fig. 9A2

Risk Parameter Instruction Fields

| Status | Tag | Field Name | Content/Options | No |
|---|---|---|---|---|
| M | 52a | USER | 4a2a2b[3b] | 1 |
| O | 50 | THIRD PARTY (Ordering Customer) | 4a2a2b[3b] | 2 |
| M | 53a | PAYMENT BANK (Sender's Correspondent) | 4a2a2b[3b] | 3 |
| ----> | | | | |
| M | 59 | COUNTERPARTY (Beneficiary Customer) | 4a2a2b[3b] | 4 |
| ----| | | | |
| M | 32A | CLEAN PAYMENT LIMIT [Value Date] Currency Code Amount | [6n] 3a 15d | 5 |
| ----> | | | | |
| O | <XX> | PAYMENT TYPE | <2a3n[4a]> | 6 |
| ----| | | | |

FIELD 52A - USER
Definition: The Unique Identifier (UID) of the User Institution initiating the instruction on behalf of itself or a Third Party.
Format: 4a2a2b[3b]

FIELD 50 - THIRD PARTY
Definition: The UID of the Third Party initiating the instruction to the User.
Format: 4a2a2b[3b]

FIELD 53a - PAYMENT BANK
Definition: The BIC code of the Payment Bank
Format: 4a2a2b[3b]

FIELD 59 - COUNTERPARTY
Definition: The UID of the Counterparty/Payee on outgoing payments instructions.
Format: 4a2a2b[3b]
Multiple instances of this field are permitted.

FIELD 32a - CLEAN PAYMENT LIMIT
Definition: [Value date] (optional), currency code and amount of Clean Payment Limit.
Format:
  [6n] date (YYMMDD)
  3a currency code
  15d amount

FIELD XX - PAYMENT TYPE
Definition: Descriptor(s) of Payment Types for Filter Process.
Format: 2a3n[4a] (e.g., MT200, MT202, etc., plus optional channel identification)
Where this optional field is left blank, the GPM Filter Process will apply to all payments made on behalf of a referenced User/3rd Party to a referenced Counterparty. Multiple instances of this field are permitted.

Fig. 9B

Risk Parameters

COUNTERPARTY: A defined entity (or aggregation of entities) recognisable as Payee(s) or Payor(s) on a payment message through reference to industry standard identifiers used in payments messaging.

CLEAN PAYMENT LIMIT: Value threshold on payments from a User/3rd Party as "Payor" in respect of a designated Counterparty as "Payee". Acts as a debit cap on payments vis-à-vis a Counterparty.

PAYMENT TYPE: Given payment type descriptors (specified in payments message standards), allows selection of payment types for subjecting to the Filter Process.

PAYMENT BANK APPLICATION INTEGRATION

Fig. 9D1

GPM Filter Process

Step A: Identify Payor

Step B: Assess whether Payor is GPM User/3rd Party
  If NO then PASS payment instruction; If YES then Step C: Identify Payee Step D: Identify whether Payee is a GPM Counterparty
  If NO then PASS payment instruction; If YES then Step E: Check whether Payee/Counterparty has been Suspended
  If YES then FAIL payment instruction + NOTIFY; If NO then Step F: Identify Payment Type Step G: Assess whether Payment Type is selected for GPM Filter Process
  If NO then PASS payment instruction; If YES then Step H: Identify Payment Amount Step I: Calculate Available Balance Step J: Assess payment amount against Available Balance
If payment amount is less than Available Balance then PASS payment instruction; If payment amount is more than Available Balance then FAIL payment instruction + NOTIFY Step K: Reduce Available Balance by Payment Amount

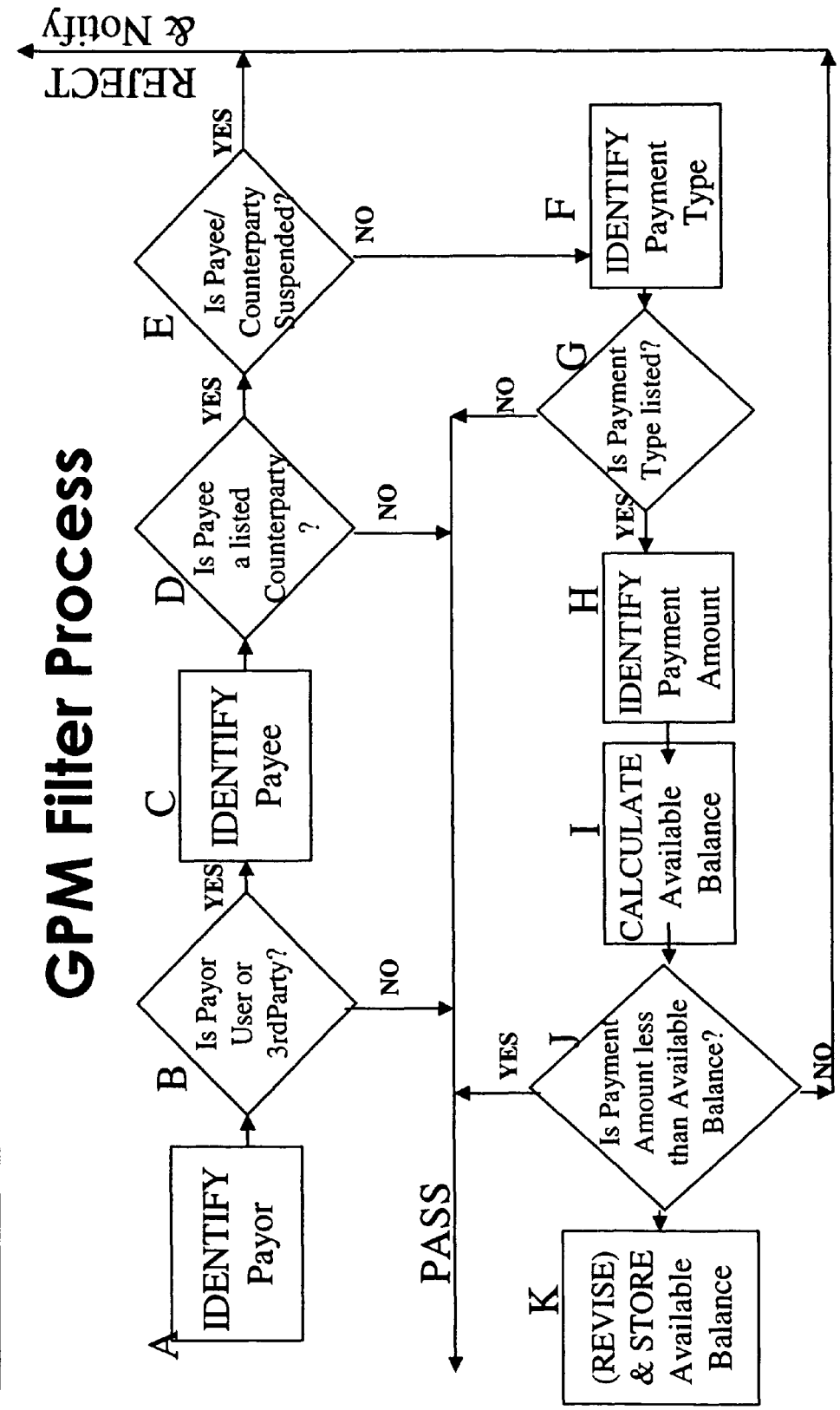
Fig. 9D2

Fig. 9E1

Step I: Calculating Available Balance

Step I.1: Identify User/3rd Party

Step I.2: Identify Counterparty

Step I.3: Identify last stored Available Balance

3a: Available Balance will be Clean Payment Limit for initial processing

3b: Available Balance last stored by Process Filter

3c: Where Clean Payment Limit is amended intraday, the difference between the new CPL and the old CPL will be added to the stored Available Balance to either increase or decrease the Available Balance accordingly Step I.4: Generate Inquiry to bank payment/account systems for incoming payments messages specifying Counterparty/Payee as a "Payor" and specifying User/3rd Party as "Payee" since last timestamp Step I.5: IF payments received, THEN total all payment amounts specified in all received payments Step I.6: Add all received amounts to the last calculated Available Balance Step I.7: Store & Forward (revised) Available Balance to Filter Process

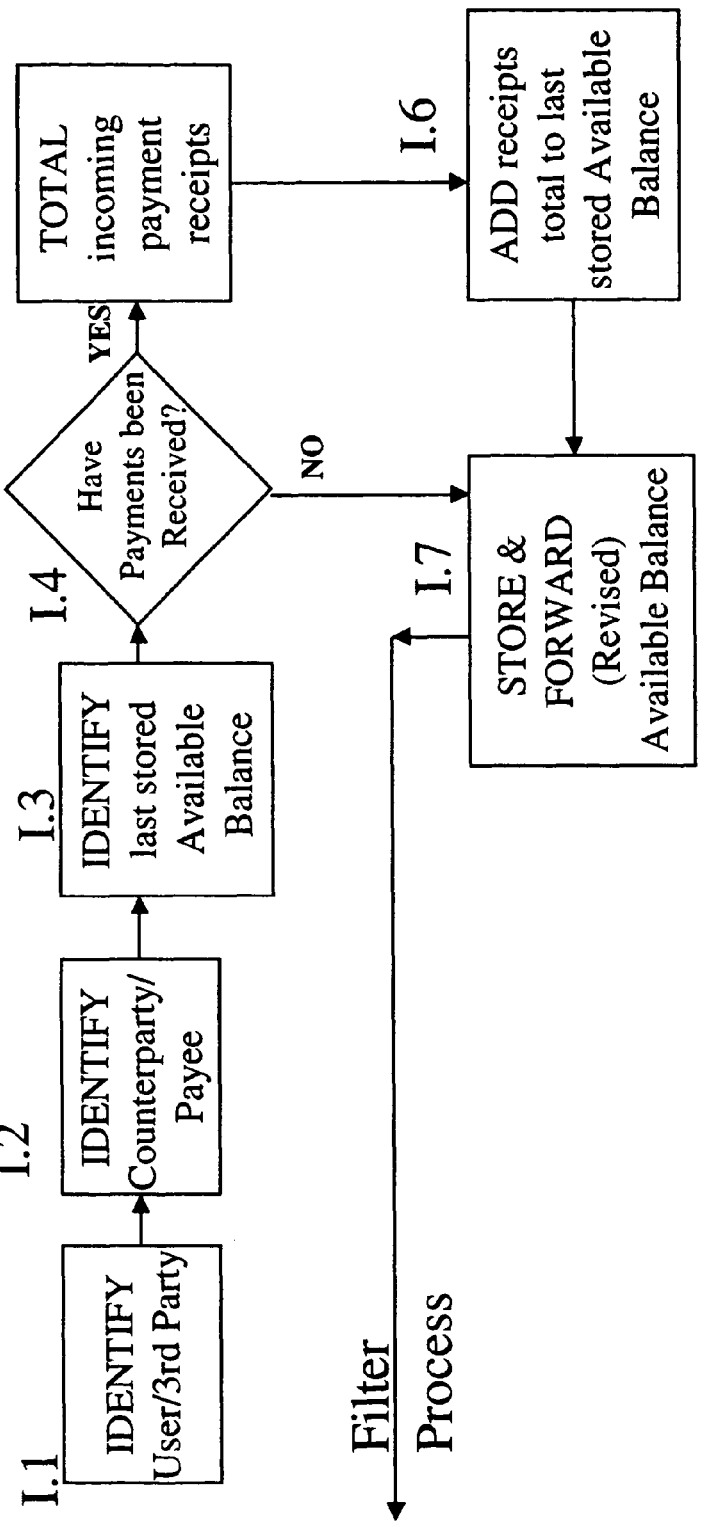
Fig. 9E2

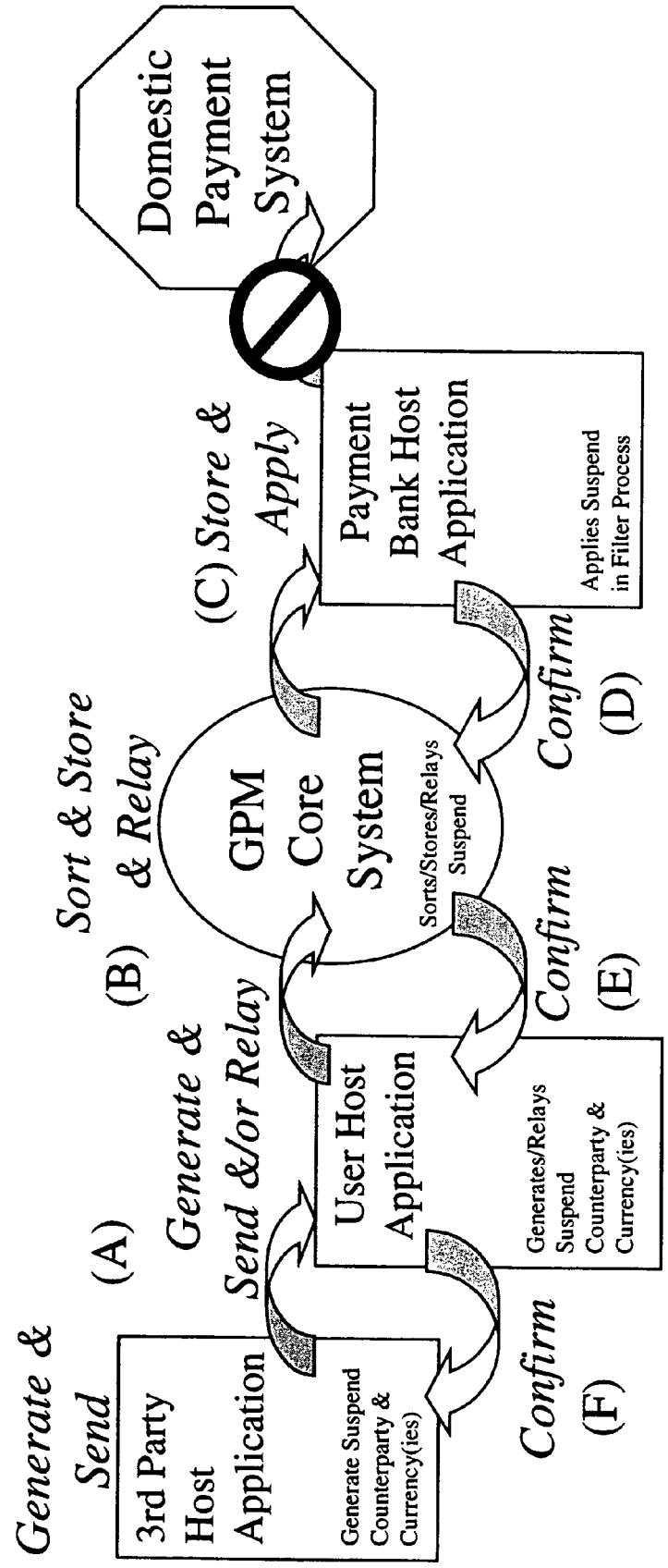
Fig. 9F1

Suspend Instruction Fields

| Status | Tag | Field Name | Content/Options | No |
|---|---|---|---|---|
| M | 52a | USER | 4a2a2b[3b] | 1 |
| O | 50 | THIRD PARTY (Ordering Customer) | 4a2a2b[3b] | 2 |
| M | 53a | PAYMENT BANK (Sender's Correspondent) | 4a2a2b[3b] | 3 |
| M | 59 | COUNTERPARTY (Beneficiary Customer) | 4a2a2b[3b] | 4 |
| M | <XX> | SUSPEND INSTRUCTION | 7a | 5 |

FIELD 52A - USER
Definition: The Unique Identifier (UID) of the User institution initiating the instruction on behalf of itself or a Third Party.
Format: 4a2a2b[3b]

FIELD 50 - THIRD PARTY
Definition: The UID of the Third Party initiating the instruction to the User.
Format: 4a2a2b[3b]

FIELD 53a - PAYMENT BANK
Definition: The BIC code of the Payment Bank
Format: 4a2a2b[3b]

FIELD 59 - COUNTERPARTY
Definition: The UID of the Counterparty/Payee on outgoing payments instructions.
Format: 4a2a2b[3b]
The message structure allows for multiple Counterparties to be listed, as many Users and Third Parties will want to aggregate affiliated market trading entities as a single, "synthetic counterparty" for payments risk management purposes.

FIELD XX - SUSPEND INSTRUCTION
Definition: Suspends payments in Filter Process
Format: 7a (e.g., "suspend")

GPM Suspend Process

3rd PARTY/USER HOST APPLICATION

Step A.1: Select Counterparty

Step A.2: Select Currency(ies)

Step A.3: Select Suspend Instruction

Step A.4: Generate Suspend Instruction

Step A.5: Confirm Suspend Instruction ⟶

GPM CORE SYSTEM APPLICATION

Step B.1: Receive Suspend Instruction

Step B.2: Identify Payment Bank(s) for selected Currency(ies)

Step B.3: Send Suspend Instruction to ⟶ Payment Bank Host Applications

Step E: Confirm Suspend Instruction Implemented ⟵

PAYMENT BANK HOST APPLICATION

Step C.1: Receive Suspend Instruction

Step C.2: Apply SUSPEND in Step 5 of Filter Process

Step D: Confirm Suspend Instruction Implemented

Step F: Receive Confirmation Suspend Instruction Implemented

GPM Risk Reduction

- Clear limits on Payment Risk and Liquidity Risk
- Effective elimination of Systemic Risk
- No disruption to existing payment mechanisms
- Unilateral choice of Risk Parameters and GPM implementation with counterparty

US 7,822,663 B2

REDUCING RISK IN A PAYMENT-BASED TRANSACTION BY RETURNING PAYMENT AUTHORIZING INSTRUCTIONS TO A PAYMENT QUEUE FOR LATERT RE-EVALUATION

CROSS-REFERENCE TO RELATED U.S. APPLICATIONS

This Application is a Continuation of application Ser. No. 09/513,440 filed Feb. 25, 2000, now U.S. Pat. No. 7,283,977 and incorporation herein by reference as if fully set forth herein.

BACKGROUND OF INVENTION

1. Field of Invention

The present invention relates to an improved method of and system for mitigating payments risk, liquidity risk and systemic risk in the settlement of foreign exchange transactions and many other payments-based transactions.

2. Brief Description of Prior Art

The foreign exchange (FX) markets in our world trade over $1 trillion worth of capital currencies daily. Economic order throughout the global banking system generally requires that parties engaging in such foreign exchange transactions make payments due thereunder in a timely manner to prevent default and the consequences associated therewith.

As shown in FIG. 1, the conventional method of making payments in connection with foreign exchange transactions, takes place over a standard 3 day cycle. On the Trade Date, various foreign exchange transactions are dealt either by telephone or electronic execution system between a User of the GPM system and a market counterparty. This is followed by the exchange of MT300 messages, in a prescribed industry data format, via a global bank communications network maintained by the Society for Worldwide Inter-bank Financial Transmissions (S.W.I.F.T). This global bank communications network, commonly referred to as the SWIFT network, is a proprietary value added network (VAN) which use electronic data interchange (EDI) message format standards. The International Standards Organization (ISO) recognises S.W.I.F.T. as the organization responsible for the promulgation and maintenance of these message standards within the global banking industry.

Once the MT300 messages are matched in each party's back office, each party generates a payment instruction for the sold currency and a pre-advice for the bought currency to a bank's own branch, or a correspondent bank holding an account for the bank in a foreign currency. Where banks make payment using correspondent banks, they undertake payment for their own account, whether or not they are involved in an underlying transaction as principal or agent of a non-bank market participant. The message types most important to payments include the MT200 for own account payments, MT202 for general commercial payments, and MT210 Pre-advice of expected receipt of funds.

The correspondent bank uses the S.W.I.F.T. network to confirm transactions in an account back to the account holder. The most important messages for this purpose are the MT900 advice of debit to account, MT910 advice of credit to account, and MT950 statement of daily account activity. In short, correspondent banking is a mechanism used by banks to effect payments in currencies other than their own.

All payment message types reference the paying bank, the account holder (if any), the receiving bank, the counterparty account holder (if any), and the unique number identifying the underlying transaction using the prescribed industry data format. Messages to correspondent banks are sent using the S.W.I.F.T. network. Messages in domestic payments systems are sent using the network facilities and formats prescribed by the individual domestic payment system.

Payments within domestic payment systems are currently managed by the construction of a queue of payments messages for a particular day within a bank directly linked to a domestic payment system. Liquidity management software is used to control the flow of payments messages from the queue into the domestic payment system for clearance, to monitor balances at the central bank, and to monitor payment conditions vis-a-vis other directly participating banks. The liquidity management software allows payments to proceed according to the priority of individual payment messages and the liquidity available in the system.

Settlement Date is normally two business days after Trade Date for spot transactions in foreign exchange, and can be much later for forward transactions. On the Settlement Date, each branch of a bank operating the link to the domestic payment system for a currency, or each correspondent bank acting as a nostro for other banks' payments in a currency, will construct a payments queue containing all the messages requiring payment on that date. Where the payments are to be made via a real-time gross payment system or other system accommodating payment instructions on a real-time (as opposed to batch process) basis, the payments are released one by one as sufficient liquidity in the clearing account of the bank permits. Liquidity management software is used by banks connecting to these systems to keep track of the balance in the clearing account within the payments system and release payments as liquidity permits. Also, such software will generally ensure that sufficient balance or credit exists in the account of the account holder to cover the payment. Such software shall hereinafter be described as "liquidity/payments manager." Payments made from the queue reduce the balance, while payments received from other banks in the system increase the balance. The process continues until all payments on the queue are sent.

Banks acknowledge payments and receipts to their correspondent banking account holders using the S.W.I.F.T. network, and to non-bank account holders using various methods. For correspondent banks, an MT900 is sent following debit of a payment from a client's account. An MT910 is sent following credit of a received payment to a client account. At the end of the day, an MT950 statement of account activity is sent to confirm every debit and credit through the account during the day, and the opening and closing balances, using an industry standard data format.

The Reconciliation Date is normally the day following the Payment Date. Institutions active in the foreign exchange markets typically take all the MT950 statements from all branches and correspondent banks acting on their behalf for settlement, and provide these statements as inputs to a batch process for reconciliation. This process determines whether for each payment made in respect of a trade, whether a counterpayment was duly received as expected. If payment has been made, but no counterpayment received, then the party is at risk for the gross amount of the payment as an unsecured creditor of the counterparty. An exceptions report is generated as a result of the reconciliation batch process, which is used for querying missed payments with counterparties, generally by telephone. Only after a query (often made difficult by geographical distance and time zone differences) can a decision be made about the credit-worthiness or potential default of a counterparty. As a result it can be two or three days following missed payments before a counterparty is declared in default and further payments are suspended. As a result of this process overall, the risk to a foreign exchange market participant, arising because payments are typically instructed on a transactional basis (as obligations are incurred) and are processed independent of other transactions which would result in expected receipts, may be as much as three days gross value of payments to a counterparty. This risk is known as "payments risk".

Payments risk may well exceed the capital of a bank or other financial institution, raising a potential that a counterparty failure could cause their own insolvency, arising from the difficulty that financial institutions are likely to have raising funding rapidly to cover a shortfall should expected receipts fail to materialize on the payment date. This risk is known as "liquidity risk".

Liquidity risk, in turn, may perpetuate a systemic impact throughout the chain of counterparties active in the financial markets, arising from payment failure due to liquidity problems, through a chain of co-dependent payments transactions. This risk is known as "systemic risk" and is a principal concern of central bankers and supervisors in overseeing the strength of capital markets. Payments risk, liquidity risk, and systemic risk associated with participation in payments systems are summarized in the table of FIG. 2.

Cross-border payments risk in the foreign exchange markets has been exacerbated by recent trends in the markets. Many smaller participants now trade directly in the markets through electronic foreign exchange trading systems. The past five years have seen the market share of the top dealing banks fall from approximately 60 percent of the market to less than 40 percent of the market, demonstrating their displacement by more active smaller institutions. These smaller institutions tend to have lower credit ratings, and so present higher levels of payments risk to their counterparties. Additionally, there has been a shift toward increased trading volumes in the currencies of emerging economies. These currencies are generally less liquid and more volatile, particularly in conditions of general market uncertainty, and so present higher liquidity risk and systemic risk in the event of a financial failure.

In addition, there has been a movement toward more rapid settlement of transactions, with some transactions now settling on the same day as trading or the next day, as opposed to the customary two days following trade date. The shorter settlement times put pressure on banks involved in payments as they increase uncertainty as to liquidity, and are often inconsistent with existing systems for trade processing and reconciliation.

Even in a single currency, there is a more general payment risk associated with banks and commercial entities making payments to parties who are expected to make unrelated payments back on the same day. Currently, all general commercial payments on behalf of account holders are made irrespective of whether expected receipts actually occur. The result is that financial market participants and others incur credit risk on their payments which can result in large losses in the event of the counterparty's insolvency. This risk is possibly increasing as financial institutions are disintermediated from financial markets, with many institutions dealing directly with one another on a regular basis through electronic communications networks (ECN) and otherwise.

Hitherto, a number of prior art systems and methods have been proposed for mitigating or managing the various types of risk associated with making payments in connection with foreign exchange transactions in our global financial capital market system.

One proposed method of managing payment risk involves the "contractual netting" of payment flows, whereby parties agree to net all payment obligations for any given date and only effect net payments to one another.

Contractual netting requires that both parties sign an enforceable legal agreement to net their obligations, that the parties agree daily the specific amounts of the payment flows in settlement of transactions, and that the parties maintain systems for the reconciliation of payments against transactions to ensure that underlying transactions have been settled. Supervisors generally require independent legal opinions supporting netting enforceability before conferring any benefit of risk reduction for capital adequacy purposes. In consequence of its complexity and legal uncertainty in many countries, contractual payments netting embraces only one-quarter of transactions in foreign exchange markets.

In connection with the above method of risk management, a system referred to as FXNETexists for the calculation of bilateral netting exposures and net payment amounts in traded currencies for its participants. This system is designed to reduce the operational complexity of bilateral netting on a daily basis as between its users. It has less than 100 bank users.

In addition, two other systems have been proposed for providing multi-lateral netting, or clearing house, operations to the foreign exchange markets. The first system is the Multi-Net system which never became operational, and was abandoned in late 1996. The second system is the Exchange Clearing House (ECHO) which was operational for several years, but operations were suspended in 1998 because they were deemed uneconomic.

CLSBank has proposed an alternative method of managing risk in connection with foreign exchange transaction payment systems. This method involves developing a clearinghouse which seeks to provide a tiered system for clearing foreign exchange settlements, ending with value-for-value settlement of foreign exchange transactions through the agency of a special purpose bank with accounts at participating central banks. CLS Bank's clearinghouse is only effective for transactions wholly in the currencies admitted to the system (i.e. 7 currencies are proposed for initial operations), only market participants joining the CLS system or clearing through participants, and only for foreign exchange settlements. The CLS system requires substantial investment and changes to existing systems for reporting and matching of transactions, and for payment and liquidity management among participants. Even if CLS Bank were to settle all eligible foreign exchange trades for all its 60 shareholder banks, this would only address the risk on 27 percent of foreign exchange market transactions.

In summary, prior art methods of and methods for managing risk in connection with FX and other payments transactions throughout the world suffer from the following shortcomings and drawbacks: they require agreement of the transaction counterparty; they do not extend to non-bank counterparties; they are complex and difficult to implement; and they do not adequately enable a typical foreign exchange or other market participant to control the risk arising in respect of the plurality of its counterparties, currencies and payment types.

Consequently, there is a great need in the art to provide an improved method of and system for mitigating risk associated with participation in payments systems involved in settling foreign exchange and other financial transactions.

OBJECTS OF THE PRESENT INVENTION

Accordingly, a primary object of the present invention is to provide a global computer-based method of and system for mitigating risk arising in connection with foreign exchange settlements and other payments between financial market participants, while avoiding the shortcomings and drawbacks of prior art methodologies.

Another object of the present invention is to provide such a system, wherein the control of payments risk is efficiently enabled in as many currencies as may be interoperable with such a system.

Another object of the present invention is to provide such system in the form of a real-time Internet-based method of and system for controlling payment flows in a way that reduces payment risk between counterparties, both within a single domestic payment system and globally through a multi-currency implementation.

Another object of the present invention is to provide such a system as enables the control of payments risk arising for an account holder within a single currency, as well as cross-border payments risk arising from payments in a plurality of currencies.

A further object of the present invention is to provide a computer-based payment risk management system to enable control of payments risk for all payment flows, whether arising from foreign exchange transactions or other payment types.

Another object of the present invention is to provide such a system as enables a participant to unilaterally control his risk vis-a-vis a particular payments counterparty, without the necessity for the counterparty's agreement or cooperation.

Another object of the present invention is to provide such a system as allows participants to more efficiently manage their current business, reduce overhead, improve returns on capital, and support new business with counterparties by reducing payments risk and enabling more efficient liquidity and credit risk management.

Another object of the present invention is to provide such a computer-based system and software that can readily be used by all foreign exchange market participants, from money-center banks to corporate end-users worldwide.

A further object of the present invention is to provide a computer-based payments risk reduction system which does not require substantial change to the conventional market trading, confirmation, matching and clearing practices in the foreign exchange market or payments clearing and settlement practices in correspondent banking.

A further object of the present invention is to enable each financial institution or corporate hierarchy to determine the optimal allocation of system access, such that any individual branch, subsidiary, company or other legal or organizational entity can have separate access.

A further object of the present invention is to provide a computer-based system in which separate accounts can be flexibly aggregated or disaggregated by participants for risk management and reporting purposes to promote effective oversight of group or individual participant use of the system.

A further object of the present invention is to provide a computer-based system in which separate counterparty accounts can be flexibly aggregated or disaggregated for risk management purposes and reporting purposes according to participant assessment of risk correlation between affiliated, connected or similar counterparties.

A further object of the present invention is to provide a computer-based system in which payment flows with a counterparty or counterparties in a plurality of currencies can be flexibly aggregated for risk management purposes and reporting purposes.

A further object of the present invention is to provide a computer-based payments risk reduction system that is consistent with and complementary to the existing network for inter-bank financial communications (S.W.I.F.T.) and the internet protocol networks increasingly used by financial institutions.

A further object of the present invention is to provide a computer-based payments risk reduction system which does not require information details regarding the underlying transactions on which the system acts to reduce payments risk.

A further object of the present invention is to provide a computer-based payments risk reduction system which allows individual participants to determine unilaterally their tolerances for payment risk according to counterparty, currency and payment type.

A further object of the present invention is to provide such a system in which participants can view, enter and alter their risk parameters for counterparties, currencies and payment types on a real-time basis.

A further object of the present invention is to provide such a system in which the payment parameters of account holders can be entered into the database of the system by way of screen-entry, batch-entry or integration with internal systems processes.

A further object of the present invention is to provide such a system in which payments risk can be controlled in an automated manner through integration with the existing payments systems operating within payment banks directly connected to domestic payments systems.

A further object of the present invention is to provide such a system as enables payment banks to integrate the system host application in a modular fashion in connection with their participation in domestic payment systems with a high degree of openness, flexibility and interoperability.

A further object of the present invention is to provide a quicker and easier means for monitoring payment flows and reporting exception situations which may indicate a counterparty payment failure.

A further object of the present invention is to provide a computer-based system for a payment bank to notify account holders of payment problems intra-day, enabling them to take such actions as will forestall any adverse impact on liquidity in that and other currencies.

A further object of the present invention is to provide a quicker and easier means for inquiries into exception situations between participants, counterparties and payment banks, facilitating earlier corrective action or remedial action as appropriate.

A further object of the present invention is to provide a computer-based system for account holders to notify payment banks in real-time of their wish to suspend any further payments to an individual counterparty.

A further object of the present invention is to provide the computer-based system capability within a payment bank to efficiently and effectively suspend any further payments to a particular counterparty on behalf of an account holder, following receipt of a request from an account holder to do so.

A further object of the present invention is to provide a computer-based system enabling automated calculation of global risk positions based on payments activities in multiple payments systems.

A further object of the present invention is to provide a computer-based system which integrates the advantages of Web-based information management, browser interfaces, application-to-application data interchange, object-oriented programming and open systems technologies to deliver improved flexibility, extensibility, modularity, interoperability and other information management advantages in connection with payments risk management.

A further object of the present invention is to reduce or eliminate the systemic risk that a payment failure by one market counterparty may lead to failure of contingent payments down a chain of interrelated payments transactions, and thereby threaten the liquidity and integrity of payment and banking systems within a single market or globally.

A further object of the present invention is to provide such a system, in which a participant's payments liquidity is optimally used to meet payment obligations in an automated manner.

A further object of the present invention is to provide such as system in which liquidity management software is employed to address cross-border payment risk or payment risk arising on the level of the individual account holder within a participating bank.

A further object of the present invention is to provide such a system in which payment instructions can be processed very rapidly after negotiation of the underlying transaction without compromising payments risk mitigation.

A further object of the present invention is to provide such a system as enables access via a plurality of internet protocol networks and a plurality of computing devices, and flexibility in the use and configuration of access software to meet individual functional requirements and capacity to support technological integration.

A further object of the present invention is to provide such a system in which many-to-many data processing rationalizes the flows of information between host applications located anywhere around the globe (in both developed and emerging markets) without the prejudices and disadvantages arising from geographical dispersion.

A further object of the present invention is to provide such a system in which payment risk parameters and other data entered into the system are automatically interpreted by rule-based interpretation procedures as to processing requirements.

A further object of the present invention is to provide such a system in which account holder payment parameters are managed on a database and communicated as operable parameters for payments processing by host applications in payment banks.

A further object of the present invention is to provide a system which uses or interoperates with industry standard data formats for the capture and transmission of like data to enable efficient interface with pre-existing banking applications and systems.

A further object of the present invention is to provide a system which provides appropriate security and integrity for the transmission of all data across its network via cryptographically secure sessions and digital certification of host application subscribers.

These and other objects of the present invention will become apparent hereinafter and in the Claims to Invention.

SUMMARY OF INVENTION

According to one aspect of the present invention, a Global Payments Management (GPM) system and method are provided for the purpose of tying together Third Parties, Users and Payment Banks sites (in the United States, Europe, Asia and other locations throughout the world) via a global communication network (e.g., interconnected internet protocol networks and a virtual private network) to enable Third Parties and Users to communicate payments risk parameters and other instructions to Payment Banks making and receiving payments on their behalf, to facilitate real-time communications system-wide, and to provide more timely and better quality information on payments risk management.

In order to support Third Parties, Users and Payment Banks located in different time zones, the GPM System preferably is available 24 hours a day and seven days a week. Such high availability allows Third Parties, Users and Payment Banks to participate in the system in a substantially equal manner, overcoming the disadvantages of remote location inherent in foreign exchange trading and settlement. The system takes advantage of advances in Internet Protocol (IP) networks, Web-based programming and electronic data interchange (EDI) techniques to ensure its compatibility with the plurality of existing operating systems, legacy software and participants' levels of technological sophistication. The system can be used by all market participants, large and small, who wish to reduce the payment risk exposures arising from their participation in foreign exchange markets and/or improve the risk and liquidity management associated with their domestic and international payments generally.

Third Parties potentially include all financial and commercial entities involved in substantial wholesale payment flows as account holders with a User bank or non-bank financial institution.

Users potentially include all banks and non-bank financial institutions instructing payment on their own behalf or as correspondent on behalf of Third Parties, and all financial and commercial entities as account holders in a domestic payment system. Third Parties in a cross-border context may simultaneously be Users in a domestic context.

Payment Banks potentially include all banks and non-bank financial institutions directly linked to a domestic payment system. Users may simultaneously be Payment Banks.

Counterparties potentially include all market participants who transact with Users and Third Parties to create payment obligations. The GPM System of the present invention will enable Users and Third Parties to flexibly structure identification of counterparties to aggregate or disaggregate affiliates within a corporate group or branches of a financial institution.

The GPM System of the illustrated embodiment supports the following functionalities: Third Party and User host applications for screen, batch and automated entry of payment risk parameters by currency, counterparty and payment type; a core system host application for automatic rule-based sorting of parameters according to Payment Bank acting on behalf of Users for payments in a particular currency and/or to a particular counterparty; communication of parameters to the Payment Bank host application controlling payment flows to the domestic payment system(s); automatic rule-based filtering within the Payment Bank host application of payment messages against User-specified payments risk parameters to ensure continuing compliance with parameters; real-time notification of exception conditions from the Payment Bank to the User (e.g., to indicate counterparty payment difficulties); real-time communications messaging between Third Parties, Users and Payment Banks to facilitate inquiry into and resolution of exception conditions; ability for the Payment Bank to manually override the Payment Bank software to enable a payment to proceed notwithstanding non-compliance with parameters; ability for a User to instruct the Payment Bank to suspend any further payments to a particular counterparty; ability for Payment Bank host application to stop any further payments to any counterparty; ability to flexibly generate a variety of reports periodically or on request according to the requirements of Third Parties, Users and Payment Banks; secure, reliable and encrypted communications; and accommodation of multiple Third Parties, multiple Users, and multiple Payment Banks at multiple geographical locations.

In accordance with the illustrative embodiment of the present invention, Third Parties have pre-existing account relationships with Users such that Users transact payments on their behalf. Users acting on behalf of Third Parties are institutions possessing a Bank Identifier Code (BIC) as published by S.W.I.F.T., a universal standard identification method recognised by the ISO. The BIC is a unique address which, in telecommunication messages, identifies precisely the financial institution involved in financial transactions.

Users have pre-existing account relationships with Payment Banks such that Payment Banks transact payments on their behalf. Banks or branches acting as Payment Banks for a User are identified by their BIC.

The GPM System has five principal component parts: a GPM Network, a Third Party Host Application, a User Host Application, a GPM Core System and a Payment Bank Host Application. The GPM Network is a network of commercial and privately operated IP networks interlinked to the GPM Virtual Private Network (GPM/VPN) using routers. The GPM/VPN, operating with controlled access, cryptography and firewalls, will ensure superior security, integrity and resiliency for the GPM System.

The customer account structure within the GPM System is deliberately flexible as to organization and number of customer accounts for any given corporate entity or affiliated group. Banks, for example, may choose to assign each branch dealing in the markets for its own account a separate User status within the GPM System, or alternatively may wish to centralise control in a single branch through assigning other branches the status of Third Parties. Corporate treasuries may similarly disaggregate corporate divisions as Users with their own accounts, or aggregate them as Third Parties under a single User account. Regardless of account structure, the GPM System enables accounts to be linked together for reporting purposes in flexible hierarchies of User and Third Party accounts, according to whatever configuration a User may require. Throughout the preferred embodiment of the GPM System, its software components are created using the Java™ programming language, its data format protocol expressed in the eXtensible Mark-up Language (XML), and its human-machine interfaces realized using Web (http) browser interfaces enabling human users to interact with the system. The Web-based architecture of the GPM system has significant advantages in terms of flexibility, openness, interoperability and maintenance, in particular enabling flexible publication of information and software upgrades, interoperability with a wide variety of pre-existing technology platforms, on-line application interaction and communications system-wide, and other processes related to Web-based and distributed computing.

Preferably, network interconnection between Third Parties and Users will be jointly determinated. Third Parties communicate their risk parameters and other payment-related information to Users. Only Users can pass risk parameters or payments-related information through to Payment Banks, as only the account holder (the User) can properly instruct a bank (the Payment Bank) as to actions affecting an account.

The Third Party Host Application is realized as software provided to Third Parties as clients of Users at multiple sites located globally. The software components of the GPM system, including the Third Party Host Application, can be downloaded from a Website on the World Wide Web (WWW) with or without payment of a fee. Various instances of the Third Party Host Application may be available to cater for differences in language, financial markets activity, and relative technological and financial sophistication of the plurality of Third Parties. The Host Application enables a Third Party to request that a User bank generate processes in the GPM System reflecting the expressed preferences of the Third Party with respect to risk management, messaging and reporting. Whether the User is required to implement these requests through the GPM System will be a matter for joint agreement between the User and the Third Party. Third Party access to Users and the GPM System may be through manual input, batch input or automated application-to-application data interchange. Preferably, the Third Party Host Application also supports inquiries, reports and messaging similar to the User Host Application.

The User Host Application is realized as software provided to Users of the GPM system at multiple sites located globally. Various instances of the User Host Application will be available, to cater for differences in language, financial markets activity, and relative technological and financial sophistication of the plurality of Users big and small. At the simplest instance in the illustrated embodiment, a browser interface to the User Host Application will enable any small User with the capability of launching a commercially available browser to access, manually input to and use the GPM System. For those Users with moderate complexity (perhaps regular participants in the foreign exchange markets but not dealers themselves) an instance of the User Host Application will additionally provide facilities for file upload from commercially available spreadsheet programs using commercially available software for data translation. At the most sophisticated level, for Users who are dealers in the foreign exchange markets or commercial or investment banks, the User Host Application can integrate with pre-existing transactions systems in the middle and back office using data mapping and electronic data interchange functionalities.

On a periodic (usually daily) or real-time basis, the Users of the GPM System determine their tolerance for loss in respect of each counterparty in each currency as payment risk parameters for GPM processing, either on their own account or on behalf of Third Parties. The basic parameters are a net payment limit (which may be set to zero) and a debit cap (which may be set to zero). Users may alter risk parameters at any time. GPM Users will have the option of applying risk parameters to counterparty payments according to message type, so that the GPM System can address payment risk either for own account transfers (MT200) and commercial payments (MT202) in a cross-border context, and other categories of payments arising in domestic payment systems.

In the illustrative embodiment of the present invention, the Third Party and User Host Application access the system using commercially available Web browsers supporting eXtensible Mark-up Language (XML). The XML data protocol is extremely useful as it is capable of support for human-to-machine and machine-to-machine interactions. This provides tremendous flexibility for human interaction with the GPM System as the Third Party or User Host Application can therefore be accessed from any workstation or other device capable of launching a browser and accessing the installed software via telecommunications. This has advantages particularly for banks or companies with geographically dispersed operations, as various offices can access a single instance of the Third Party or User Host Application installed at a central site. Alternatively, an executive travelling from his office may still be able to access the Third Party or User Host Application via telecommunications link into the office's internal systems. The "risk parameter" data files are transmitted to the GPM system via IP networks interlinked by routers to a GPM Virtual Private Network (GPM/VPN). The GPM/VPN provides improved facilities for ensuring the security, integrity and resiliency of the telecommunications network. The network structure offers flexibility as well as the GPM/VPN can be interlinked via routers to commercially available internet networks (e.g., ATT, Sprint, BTSyntegra), virtual private networks owned by banks or consortia (e.g., VPNs operated by Reuters, Bloomberg, Equant, IBM), and even the Internet.

Once the GPM has received risk parameters or other messages from a User, the GPM Core System stores the input in the Data Server and processes the input in the Process Server. Data changes and messages will be sorted according to recipient using rules-based processing acting on the data fields in the files and messages. New data files are generated containing risk parameters for action by a single Payment Bank. These files are then published to Payment Bank Host Application installed as a module at Payment Banks acting for the User. Messages are sorted and routed to the appropriate recipient.

Risk parameters are used by the Payment Bank Host Application in the Filter Process Module of the present invention. The Filter Process Module is designed to interoperate with an existing liquidity/payments manager to filter payments flowing between the payment queue maintained on the bank's existing internal systems and the external domestic payment system(s) to ensure that all payments made on behalf of a User comply with the User's risk parameters. The fundamental mechanism is the comparison of the payment amount in a payment instruction against an available balance calculated for the recipient counterparty. Where the payment amount is within the available balance, the payment instruction is allowed to proceed. Where the payment amount is greater than the available balance, the payment instruction is rejected back to the payment queue for later reassessment. As payments from a counterparty are received, the available balance rises; as payments are made the available balance falls. The Payment Bank Host Application acts as the shuttle on a loom, ensuring payments flow back and forth between two counterparties in balanced measure. The Payment Bank may override the risk parameters with a manual instruction, in its discretion or at the request of a User. This feature may facilitate liquidity in a payment system, particularly one that is illiquid or highly concentrated, where failure by one bank in the system to make a payment impedes the ability of another bank in the system to make a contingent payment (i.e., a bottleneck).

The Payment Bank Host Application enables the Payment Bank to monitor the flows of payments to and from User accounts in respect of individual counterparties, allowing them to detect an imbalance which impedes further payments in accordance with User parameters. The GPM System enables the Payment Bank to notify a User in real-time should a sustained imbalance in payments received from a counterparty result in a failure to make payments to the counterparty. Such an event may indicate liquidity or payment difficulties at the counterparty, and would normally be the subject of inquiry by the User, and perhaps action to suspend further payments to the counterparty in that and other currencies, and to raise any consequent liquidity shortfall which might impact systemic payment flows.

The Filter Process Module of the present invention will have the important capability of automatically responding to a User instruction to suspend all payments to a particular counterparty, stopping all further payments as they are submitted for checking during payments processing. Alternatively, the Payment Bank may manually instruct the Filter Process Module via the Payment Bank Host Application to stop all further payments to a particular counterparty, where it deems such action appropriate (e.g., where it has been notified of an insolvency). This mechanism provides a very significant improvement on the ability to intervene to stop payments in the event of a known insolvency or other condition of similar concern.

The GPM System facilitates broad range of communications between participants in connection with payments management. Some inquiries will be handled by the system on an automated basis. For example, Third Parties (via Users) and Users may request detailed or summary information about counterparties or currencies. Third Party and User requests will be routed via the GPM Network to the Payment Bank(s) acting on their behalf to the Payment Bank Host Application. The Payment Bank Host Application has the capacity to automatically fulfill inquiry requirements according to data on the day's activities, and will then send the inquiry response back through the GPM Network to the initiating User or Third Party.

Real-time messaging will be available between all GPM System participants. A User who is alerted by a Payment Bank of a sustained payment failure may then make on-line inquiry to the counterparty, where the counterparty is also a User. The counterparty can then make inquiry to his own Payment Bank to request clarification or resolution of the payments problem.

Reports are available on a periodic or on-demand basis for all GPM Network participants. All Third Party, User and Payment Bank Host Application are capable of generating flexible, parameterized reports, according to the requirements of the request. Reports can contain data about counterparties, currencies, payment types and metrics of payment risk reduction calculated by the GPM Core System. The GPM Core System can also calculate performance metrics such as the efficiency of payments and liquidity management, and other relevant statistics.

Other advantages of the present invention will become apparent hereinafter.

BRIEF DESCRIPTION OF THE DRAWINGS

For a more complete understanding of the Objects of the Invention, the following Detailed Description of the Illustrative Embodiments should be read in conjunction with the accompanying Drawings, wherein:

FIG. 1 is a tabular schematic of the prior art three-day process for gross (transaction by transaction) foreign exchange settlements;

FIG. 2 is a table listing the different types of risks arising in payments systems;

FIG. 3 is a schematic diagram of the network for communications in the GPM System of the present invention, shown realized as a plurality of Third Party and User client workstations, applications interfaces and Web applications in operable communications with one another through a Web-enabled architecture, embracing both existing internet protocol networks widely in use in the financial markets and interlinked to a virtual private network for communications between the GPM Core System and the Payment Bank Host Application installed within Payment Bank systems;

FIG. 6 is a tabular schematic of the three-day process for foreign exchange settlements incorporating the Granular Payment Management processes;

FIG. 9A1 is a schematic representation of Risk Parameter Instruction Process in the GPM System of the present invention;

FIG. 9A2 is a tabular schematic of a message format capable of instructing payment risk parameters to a Payment Bank;

FIG. 9B is a listing of the Risk Parameters required for use in the Filter Process of the Payment Bank Host Application;

FIG. 9D1 is a step-by-step textual description of the Filter Process of FIG. 9C;

FIG. 9D2 is a schematic representation of the Filter Process of FIG. 9C;

FIG. 9E1 is a step-by-step textual description of the method for calculating the Available Balance parameter required for the Filter Process of FIG. 9C;

FIG. 9E2 is a schematic representation of the method for calculating the Available Balance parameter required for the Filter Process; of FIG. 9C FIG. 9F1 is a schematic representation of the instruction and confirmation process involved in suspending payment;

FIG. 9F2 is a tabular schematic of a message format capable of instructing suspension of payments in respect of a selected Counterparty FIG. 3 is a tabular schematic of the process for gross foreign exchange settlements using the GPM System of the present invention;

FIG. 9F3 is a step-by-step textual description of the method for suspending payments, as originated in the Third Party or User Host Application, processed through the GPM Core System, and implemented via the Filter Process in the Payment Bank Host Application.

DETAILED DESCRIPTION OF THE BEST MODE EMBODIMENT OF THE PRESENT INVENTION

Figure 4:
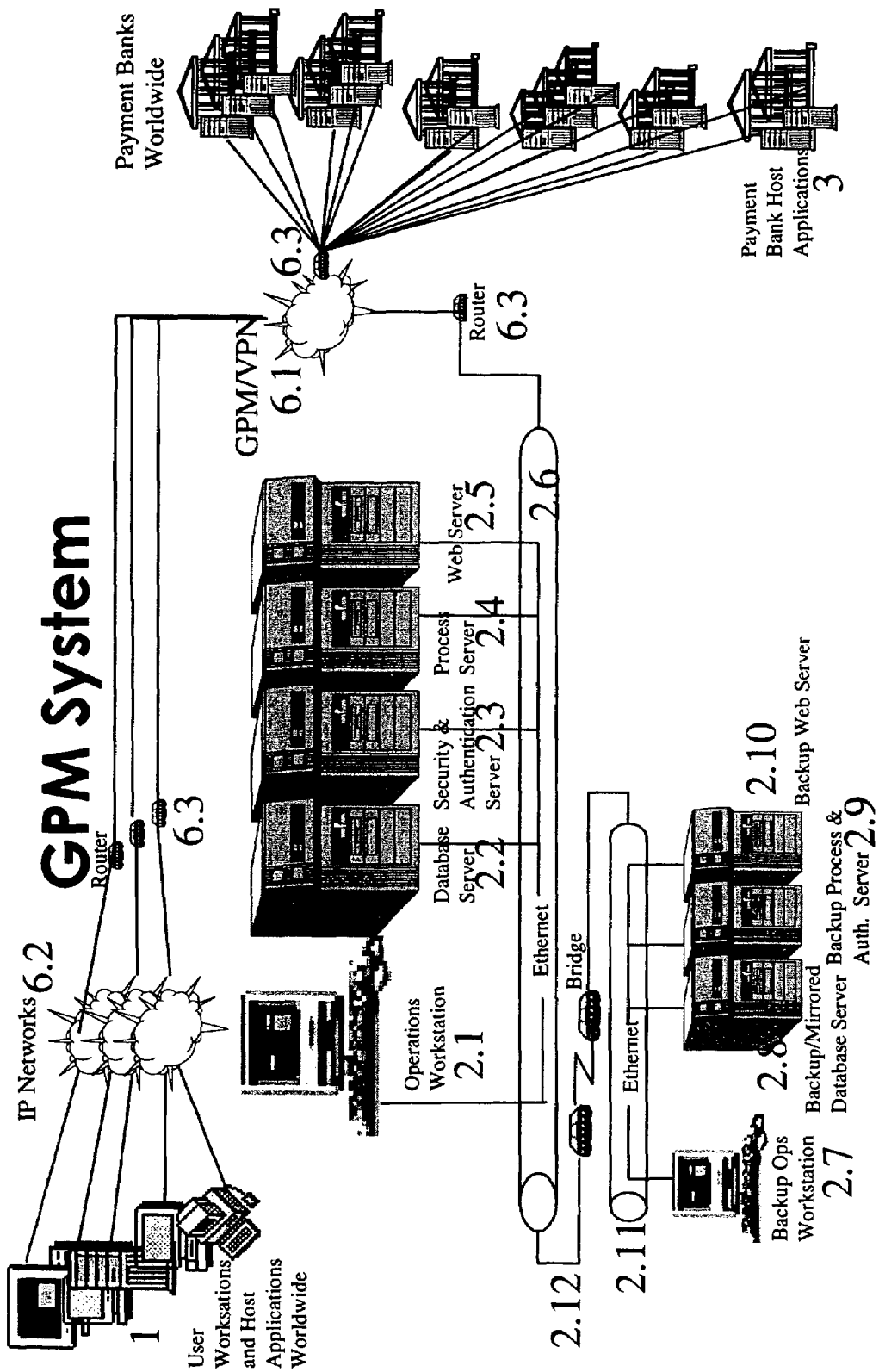
FIG. 4 is a schematic diagram of the GPM Core System of the present invention, shown realized as a plurality of client-server workstations in operable communications with each other through a wide area network (WAN) and showing various processes carried out on the client-server workstations of the system, the whole being connected by a plurality of internet protocol networks to Users and by a virtual private network (VPN) to Payment Banks.

Referring to the figures of FIG. 3 through 10 the best mode embodiment of the present invention will be described in detail below, wherein like elements and structures will be indicated using like reference numerals.

In general, the Granular Payments Management (GPM) system of the present invention may be realized in a variety of ways depending on the enabling technology available at the time of realization and particular application requirements at hand.

As shown in FIG. 3, the GPM System of the illustrative embodiment is shown comprising a Web-based network of client-server workstations on which Web-server and Web-linked interface applications are supported, and Third Party, User and Payment Bank Host Applications, and spatially distributed about the planet Earth in order to provide real-time service to the diverse Third Parties, Users and Payment Banks that the system is designed to serve. It is understood, however, that the system can be realized in other ways.

As shown in FIG. 3, the GPM System involves a network of connected Third Party Host Applications, User Host Applications, Payment Bank Host Applications and the GPM Core System running on the Web-based client-server information network. The schematic for the illustrative embodiment demonstrates the flexibility of the network for interconnecting those involved in payment flows. Third Party (4) and User (1) access mechanisms include: a plurality of proprietary network access workstations, personal computers, internally networked clients accessing servers, application-to-application integration with back office transaction processing systems, and other arrangements promoting ease of access and flexible use.

The Third Party host application (4) will connect to a User host application (1) via network arrangements agreed between them and using internet protocol communications networks, whether private, commercial or the Internet. The Third Party Host Application will be capable of automated interoperability with the User Host Application to set risk management parameters for processing of payments on behalf of Third Parties where the User acts as correspondent, to generate suspend instructions when necessary, and to define requirements for messaging, inquiries or reports via the GPM Network.

Users will be interconnected to the GPM Virtual Private Network (GPM/VPN) (6.1) via routers (6.3) and a variety of internet protocol networks (6.2), likely to include the private and commercial networks most widely used in the financial sector, but potentially including the Internet.

The VPN interconnects via a router (6.3) to the GPM Core System (2).

In the illustrative embodiment, the GPM Core System processes the data received from the plurality of Users into data to be published to the plurality of Payment Banks. The GPM Core System communicates via the VPN to the Payment Bank Host Application (3) installed as a modular component within the payment systems of Payment Banks. The Payment Banks then further interface to the domestic payment system(s) for each currency (5) using the established present interfaces and networks.

An important feature of the present invention as depicted in the illustrative embodiment is the capability for many-to-many publishing of payments data from and to diverse data formats as used within the heterogeneous plurality of Third Parties, Users and Payment Banks. The use open software applications capable of integration with any computing platform, and eXtensible Mark-up Language (XML) as the data format protocol in the Third Party Host Application, User Host Application and Payment Bank Host Application, will promote the interoperability of the GPM System with legacy systems and applications within Third Parties, Users and Payment Banks.

XML has several critical advantages. First, XML is both human-readable using browsers and XSL stylesheets, and machine-readable for application-to-application automated processing. Second, it is an open standard capable of ready translation via data mapping into other existing data standards (including S.W.I.F.T. and other EDI standards) using commercially available translation methodologies. This will promote interoperability with existing risk management, payment and other computerized and automated systems within Third Parties, Users and Payment Banks. Third, commercially available software exists to map or translate data from and to XML for other data formats. This means that Users can store data in their internal systems in pre-existing formats, and still use the data to populate their GPM inputs without replication or risk of inconsistency. Finally, XML is very flexible and extensible, allowing the creation of new data formats and data fields without impacting pre-existing applications and systems. This capacity can be used, for example, to expand the range and scope of the GPM System without impacting the interfaces with payments applications.

Human interaction with the GPM System will use browser interfaces. The use of a browser interface has significant advantages: it will be familiar to virtually all users of technology; it can be structured with customized "drop-down" lists for populating data fields for easy "pick and click" selection of counterparties, Third Parties, Users, Payment Banks, currencies and other categories of data; and it can accommodate free text messaging when appropriate. In particular, most recent instances of browsers are capable of supporting eXtensible Mark-up Language (XML), the data format protocol selected for the illustrative embodiment of the present invention, through the application of XSL stylesheets to the data. A further advantage of browser interface is that the User Host Application and Payment Bank Host Application can be installed with a corporate information technology system, capable of remote access from a plurality of geographically dispersed sites. This will facilitate "passing the book" of payments risk management between geographically dispersed branches and offices, where a Payment Bank or User wishes to actively manage and monitor payments activities worldwide.

As shown in FIG. 4, the GPM System of the illustrative embodiment comprises a plurality of access devices and applications for Users (1), providing and receiving data to and from the GPM Core System by way of a plurality of internet protocol networks (6.2), which are interconnected by way of routers (6.3) to the VPN (6.1) serving the GPM System. The VPN is then connected via router to the GPM Core System (2).

The GPM Core System in the illustrative embodiment comprises: a plurality of personal computers (e.g., IBM or similar) providing an Operations Workstation (2.1), Database Server (2.2), Authentication Server (2.3), Process Server (2.4) and Web Server (2.5), each interconnected to a Local Area Network (LAN) (2.6). A remote hot Backup System in the illustrative embodiment comprises a Backup Operations Workstation (2.7), Backup/Mirrored Database Server (2.8), Backup Process & Authentication Server (2.9) and Backup Web Server (2.10), each interconnected to a LAN (2.11). The GPM Core System and Backup System are via their respective LANs by bridges (2.12), in a conventional manner. The GPM Core System connects by way of the VPN (6.1) to the Payment Bank host applications (3) installed in the Payment Banks in the GPM System.

The User Host Application is optimally installed on a server within the User's own internal back-office systems and accessed from a workstation, personal computer or network access device. The User Host Application will usually be located at the User site principally associated with clearing and settlement of payments transactions, although it is understood that each instance of the User Host Application will promote flexibility in User access, and may be networked via internal User networks using conventional communication networking technology well known in the art.

In the illustrative embodiment, each instance of the User Host Application at the User site supports a browser interface. The particular character of the browser interface may vary from embodiment to embodiment of the invention to flexibly adapt to the User's requirements, complexity, various instances of the User Host Application, and means of GPM Network access. However, it is preferred that each such browser interface supports an array of display screens using eXtensible Stylesheet Language (XSL) stylesheets which enables Hyper-Text Markup Language (HTML) representation of XML data and document type definitions (DTDs), and facilitates easy entry of information by the User during the day, as well as displaying various types of reports and notifications produced by the GPM Core System. (It is noted that the invention could be realized at the User site to support a graphical user interface (GUI) using a GUI generator. In such a realization, the installation at the customer site would operate as a client on the server on which the User Host Application is installed.)

The computers used to realize each instance of the User Host Application can run virtually any type of operating system, such as the Microsoft Windows NT operating system, Microsoft Windows 2000 operating system, earlier versions of the Microsoft Windows operating system, Unix operating system, or the Macintosh operating system.

Each User Host Application instance cooperates with central server processes operating on the GPM Core System Servers at the central site by way of the data-packet network communication protocol supported over the VPN, and interconnected internet protocol networks. The User Host Application and GPM Core System will exchange data using an application-to-application interface.

In the illustrative embodiment, each instance of the Payment Bank Host Application installed at the Payment Bank site supports a Filter Process Module which will interoperate in a modular manner with the pre-existing Liquidity/Payments Manager software already installed in the Payment Bank's legacy system for payments processing. The particular character of the interface may vary from embodiment to embodiment of the Filter Process Module to flexibly adapt to the Payment Bank's existing systems and the interface requirements of the domestic payment system and/or multiple payment channels.

Payment Banks will additionally have a browser interface to the Payment Bank Host Application for monitoring payment flows, Third Party and User risk parameters, inquiries, messaging and reports. This browser interface will also be used to instruct manual override to enable particular payments or to suspend payments to a particular counterparty, where this is deemed appropriate in the Payment Bank's discretion. The computers used to realize each instance of the Payment Bank Host Application can run virtually any type of operating system, as above for the User Host Application. The browser interface and data structure for the invention will support multiple languages and the global character set used commonly worldwide. (It is noted that the application-to-application interface could be realized as an application client on the client-server architecture of the GPM Core System, and that the Payment Bank interface could be realized similarly with a GUI.)

In the illustrative embodiment, the processes of the present invention in the GPM Core System are realized as client-server based processes, wherein the Process Server supports the server portion of the process, while a GPM Operations Workstation supports the client portion thereof. In order to realize such client-server processes upon the GPM Core System, a data-packet network communication protocol is employed. The GPM Core System uses a suitable network communications product commercially available from a vendor of information bus technology (e.g., Tibco, IBM, etc.). The benefits of using a bus architecture include flexibility, extensibility, easier maintenance, improved security and the reinforcement of design goals such as modularity, abstraction and encapsulation.

All information items pertaining to Third Parties, Users, Payment Banks and parameters for processing in the GPM System, inquiries, messages and reporting, and the like are maintained within a database maintained within the GPM Database Server (7). In the preferred embodiment, this database is realized as a relational database using commercially available database management computer software (e.g., Oracle, IBM).

In the illustrative embodiment, the virtual private network (VPN) (4) provides appropriately high levels of security and integrity for all communications across the GPM network using commercially available technology for encryption, firewalls, anti-hacking measures, and assured message and data delivery.

Figure 5:
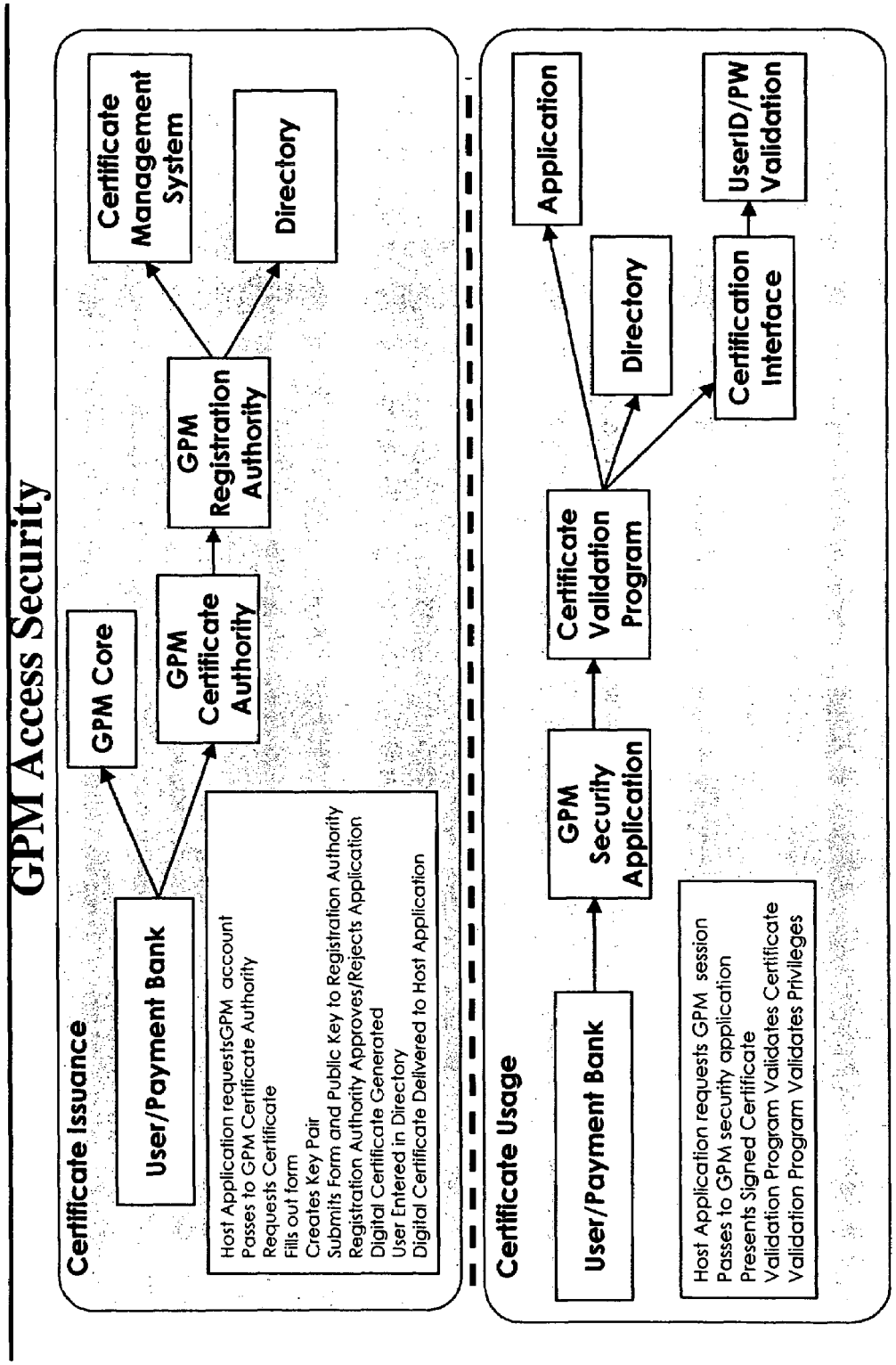
FIG. 5 is a schematic of the digital certificate issuance and usage process.

As shown in FIG. 5, the GPM System will use a system of digital certification to ensure the security of network access against use or infiltration by unauthorized persons. A digital certification process, commercially available from several digital certification authorities, will be used to issue digital certificates to all remote host applications and to ensure their use whenever any remote host application accesses the GPM Core System at the initiation of a session.

In addition, all transmissions via the GPM Network will be digitally encrypted using security technology suitable for high security banking applications.

As shown in FIG. 6, the GPM System of the present invention will greatly alter the risk profile attaching to foreign exchange settlements, but with relatively minor impact on conventional processes used by participants and their branches or correspondent banks (collectively "Payment Banks" for GPM). On the Trade Date, the dealing, confirmation, matching and payment instructions continue as before. But following the generation of payment instructions, the GPM User Host Application will allow a User to construct a profile of their payment risk in each currency vis-a-vis each market counterparty. Using this software and their own discretion regarding the tolerance of their institution for credit risk on each counterparty, the User can generate a file of payment risk parameters to control the payment risk by Counterparty, currency and payment type. The parameters for each counterparty can be set differently for each currency for which GPM operates (e.g., $100M in US dollar, as a very liquid currency, but only $10M in Malaysian Ringgit, as a relatively illiquid currency). The parameters can also be set according to payment type in accordance with the definition of payment message types by S.W.I.F.T. and the various alternative domestic payment systems (payment channels).

On the Settlement Date, the Payment Bank constructs the payment queue of payment messages for that date. The GPM Filter Process Module is a modular software component acting in a complementary manner to existing liquidity and payment queue management software interfacing to the domestic payment system. As before, the Liquidity/Payment Manager assesses whether sufficient liquidity exists in the clearing account with the domestic payment system to enable an outgoing payment. If the payment passes the liquidity/Payment Manager, then the payment is additionally submitted to the GPM Filter Process Module. This module assesses the payment message against the parameters set by a Third Party and/or User for the counterparty/recipient to see whether the parameters will be violated by the outgoing payment. If no, then the payment is returned for processing to the interface with the domestic payment system as usual. If yes, then the payment is returned to the back of the payment queue for further assessment next time it comes up in the queue.

Payment Banks will generate S.W.I.F.T. MT900 and MT910 messages as before. These messages and/or the data underlying their generation will be used to populate the metrics controlling the assessment of payments against the Available Balance calculated in the Filter Process Module. In particular, the Payor designation, Payee designation and the amounts of debits and credits will be extracted from the messages as data fields and used to update the Available Balance metric for the relevant counterparty and User/Third Party.

The Payment Bank Host Application will be capable of issuing notifications as exceptions conditions arise. For example, where all payments to any Counterparty are rejected for a half-hour period (or other appropriate timespan), a notification may be issued to both the Payment Bank and the Third Party and/or User to apprise them of the sustained failure. On receiving this alert via the GPM network, the Third Party and/or User can make appropriate inquiries immediately. Where no substantial problem exists with a counterparty, a Third Party and/or User may request via the GPM network that the Payment Bank manually override Filter Process Module to enable payments to proceed.

If the Third Party and/or User has cause for real concern, however, he can suspend further payments the counterparty via the GPM Network. A mechanism for suspension of payments will result in the Filter Process Module rejecting any further payments for the counterparty, and may be effected for all currencies for which the participant uses the GPM System in one simple and efficient instruction. The early detection of a counterparty payment failure will also reduce the systemic impact of defaults by enabling a participant of the GPM System to calculate exactly his payment exposure to a counterparty, and to fund more reliably any shortfall (necessarily limited to the Clean Payment Limit parameter) in liquidity which might affect his own ability to make contingent payments in affected currencies.

An inquiry to determine the Available Balance for the Counterparty at all Payment Banks will give the participant a precise measure of any payment exposure he has vis-a-vis the Counterparty. Because the Available Balance is updated in real-time as payments are made, it provides very precise information on the Counterparty exposure and liquidity impact of a default.

On a day-to-day basis the User can monitor his credit exposure across all currencies in respect of a particular counterparty both periodically and on-demand in a much more efficient and reliable manner. The GPM System and User Host Application will enable flexible aggregation of payment flows to provide better information to support risk management and trading decisions vis-a-vis counterparties. When combined with the limits on payment risk operating in the GPM System, the effect should be to increase the global capacity for trading volumes by reducing the present credit constraints which arise due to gross payment exposures.

There may be occasional situations in which a Payment Bank might wish to override the automated risk parameters of the Payment Bank Host Application to permit a payment to proceed, despite its non-compliance with risk parameters set by the User. In this event, an override facility is provided whereby the Payment Bank can permit individual payments to proceed for payment despite the breach of risk parameters.

On the Reconciliation Date, the Users will use the MT950s generated as usual by Payment Banks for reconciliation in their existing processes, with no change to conventional practices. They can follow up on failed settlements of individual transactions accordingly, but the advantage of learning of the amounts of payments not received on the day previous should eliminate much of the stress and uncertainty attendant on the process using prior art systems and techniques.

Figure 7:
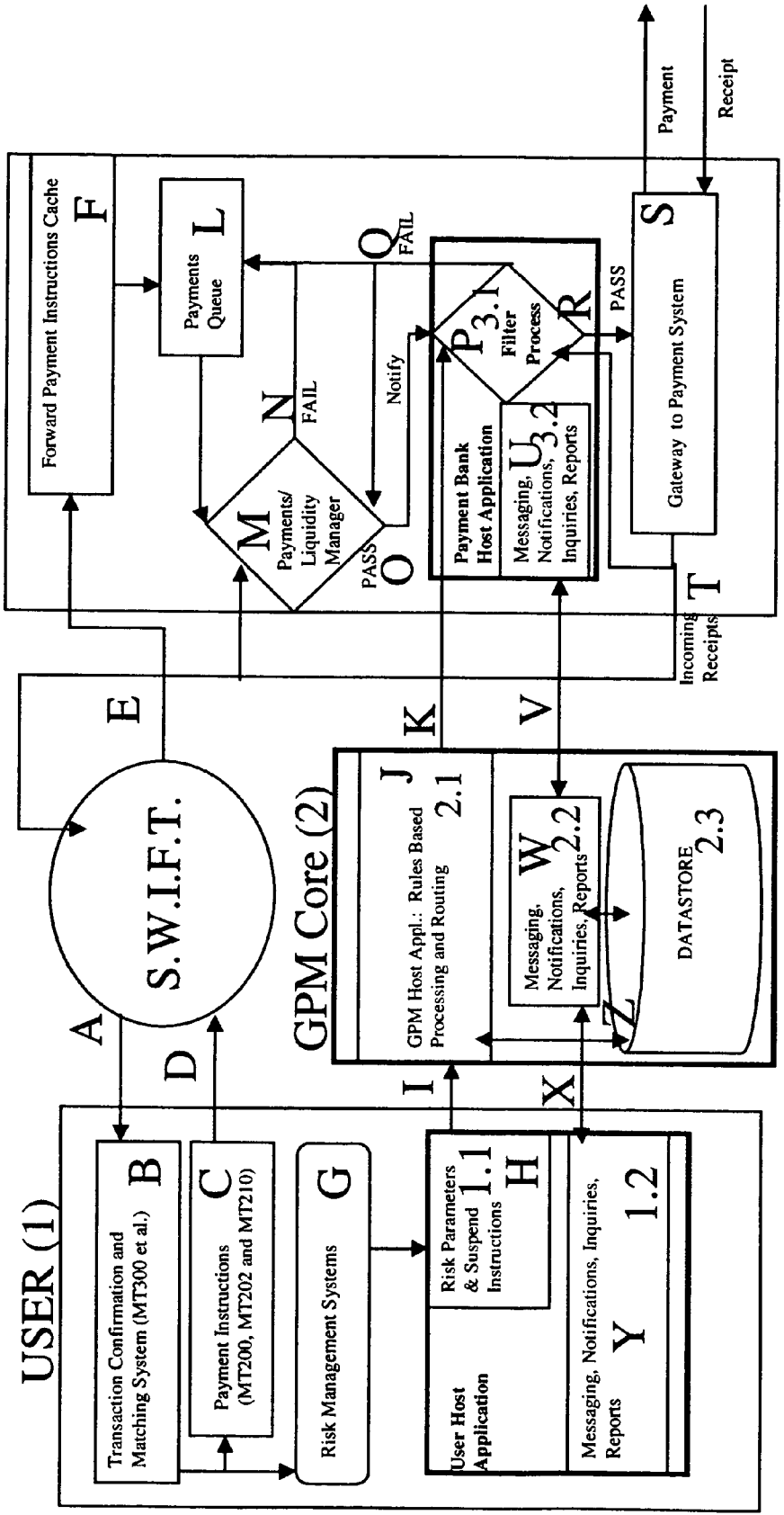
FIG. 7 is a schematic diagram of the flow of risk parameters, suspend instructions and messaging through the GPM System of the present invention.

As shown in FIG. 7, the GPM System is backward compatible with existing messaging, payments and risk management processes within market participants and payment banks. The GPM System supplements the current infrastructure by providing a logical flow of information between account holders and payment banks to improve the functionality of payments control and also communications between banks and account holders. In the illustrated schematic, the User receives confirmation of market transactions (A) from the S.W.I.F.T. network. The transaction is matched (B), and the payment instructions are generated (C) and sent (D) via the S.W.I.F.T. network to the Payment Bank (E). At the Payment Bank. the payment instructions are lodged in a forward payment instructions cache (F) until the payment date. The User then forwards the information about payments exposures to his risk management operations. The risk management operations will determine appropriate levels of risk exposure to the counterparty according to tolerance for counterparty credit risk, currency liquidity risk and other measures (G). The resulting risk parameters are entered (H) in the module for generating risk parameters and suspend instructions in the User Host Application (1.1). The User Host Application communicates these risk parameters to the GPM Core System (I), which applies rules-based processing (J) and data storage, and forwards the risk parameters (K) to the Filter Process Module in the Payment Bank Host Application via application-to-application data interchange.

On the payment date, a queue of all pending payments messages is constructed from the stored payment instructions (L). As payments operations commence, each payment message is forwarded to the payments or liquidity management software controlling payments sent to the domestic payment system (M). If the payment fails the parameters in this process, it is returned to the queue (N). If it passes, then it is forwarded to the Filter Process Module cooperating with the existing payments or liquidity management software (O). The Filter Process Module assesses the payment against the risk parameters for the counterparty/recipient (P). If it fails, the payment message is returned to the payments queue (Q). If it passes, the payment message is forwarded (R) to the domestic payment system for payment (S).

Data regarding incoming payments are captured to populate the Available Balance metrics essential to the Filter Process Module (T).

Notifications, messages, inquiries and reports can flow between the User and the Payment Bank via the GPM System in an automated or on-demand basis. In the illustration, the Payment Bank may generate a notification (U) which is sent (V) via the Core System messaging facility (W) and relayed (X) to the User Host Application for notification (Y) of the User. All message traffic is stored for audit purposes (Z).

Figure 8:
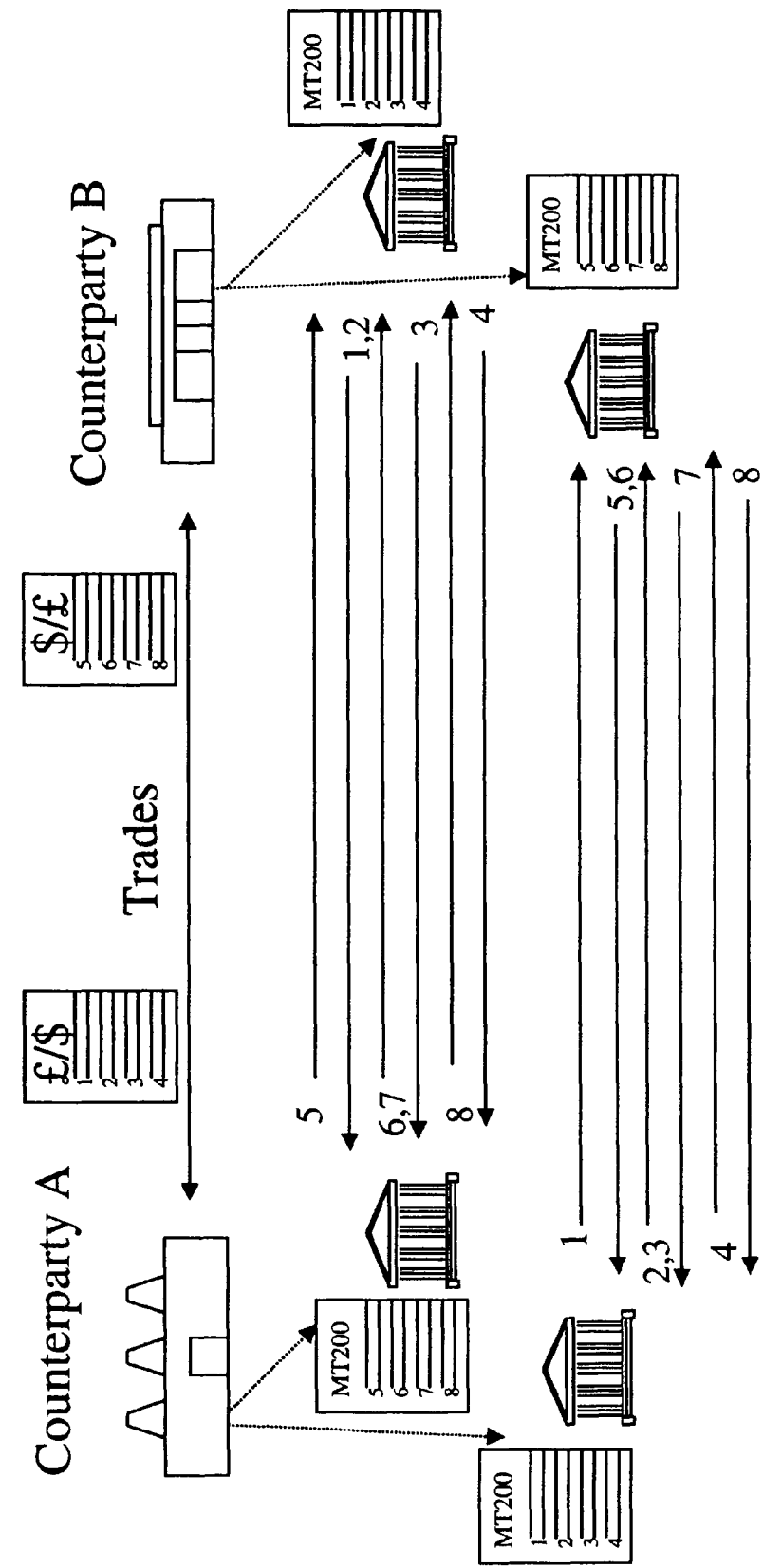
FIG. 8 is a schematic representation of the controlled and sequenced flows of payments between two Users via their Payment Banks.

As shown in FIG. 8, the GPM System of the present invention enables payments to be randomly sequenced as between two counterparties so that no great imbalance in credit exposure occurs between them. Payments are released by the Filter Process Module up to the Clean Payment Limit, as determined by the Third Party or User. Following that, further payments to the same counterparty will be filtered and returned to the payments queue. Only when receipts of expected payments from the Counterparty are credited to the User's account (designating either the User or a Third Party as beneficiary) will further payments be released. In this manner, the Filter Process Module ensures the regularity and moderation of payment flows between two parties.

Only one party needs to be a User or Third Party for the GPM System to prove effective. The ability to control risk without the express agreement or cooperation of a counterparty is a significant innovation.

As shown in FIG. 9A1, the Third Parties and Users accessing the GPM System will generate and send instructions (A and B) to their Payment Banks (branches and banks making payments on their behalf into domestic payment systems) to control the payments against risk parameters. These risk parameters are designed to control the level of payment risk and liquidity risk arising in connection with a Counterparty. The Third Party Host Application (4) will be capable of generating risk parameters, but will not have direct access to the GPM System. The Third Party must therefore forward its risk parameters to a User acting on his behalf (A). The User Host Application (1) can generate risk parameters on behalf of the User and Third Parties, and send these, as well as relaying any Third Party risk parameters, to the GPM Core System (B). The GPM Core System (2) will analyse and sort received data files using rules-based processing. Data will be stored, and also forwarded to designated recipients. Risk parameters will be forwarded to the Payment Banks (C) designated as making payments on behalf of Users and Third Parties. The Payment Bank Host Application (3) will store received risk parameters and apply them during the Filter Process (D). Only payment instructions passing the parameters in the Filter Process will be forwarded to the Domestic Payment System (5) for payment (E).

As shown in FIG. 2A2, the risk parameter instruction generated by the Third Party or User Host Application will contain a variety of data relevant to the routing and application of the risk parameters. The data format fields follow content standards defined by S.W.I.F.T. for payment messages, and so will be backward compatible with existing payment processing systems and industry conventions. Although the data is presented here in the format of an industry standard message, the data in the Third Party or User Host Application will be generated using a flexible browser interface, allowing easy and transparent selection of counterparties, currencies, payment types. It will be captured in the format of an XML document type definition (DTD) suitable for the structure of data, and in particular the need for flexibility in the characterization of counterparties. The representation here indicates that there can be multiple counterparties designated as subject to a single risk parameter. This will be particularly useful for aggregating affiliated branches or corporate entities which are likely to be mutually implicated in a default or insolvency. In this manner, a User or Third Party can control risk in a manner tailored to his perception of correlation among affiliated or similar trading entities. The representation also permits multiple categories of Payment Type, recognizing that Users or Third Parties may wish to be selective in applying GPM processing to particular categories of payments or alternative payment channels.

As shown in FIG. 9B, the Risk Parameters operating in the Filter Process are quite simple, consisting of the Counterparty (however designated or aggregated), the Clean Payment Limit, and designation of Payment Types. These three parameters are sufficient to enable the Filter Process to control the payment risk and liquidity risk arising in connection with the Counterparty for all payments of the designated types.

Figure 9C:
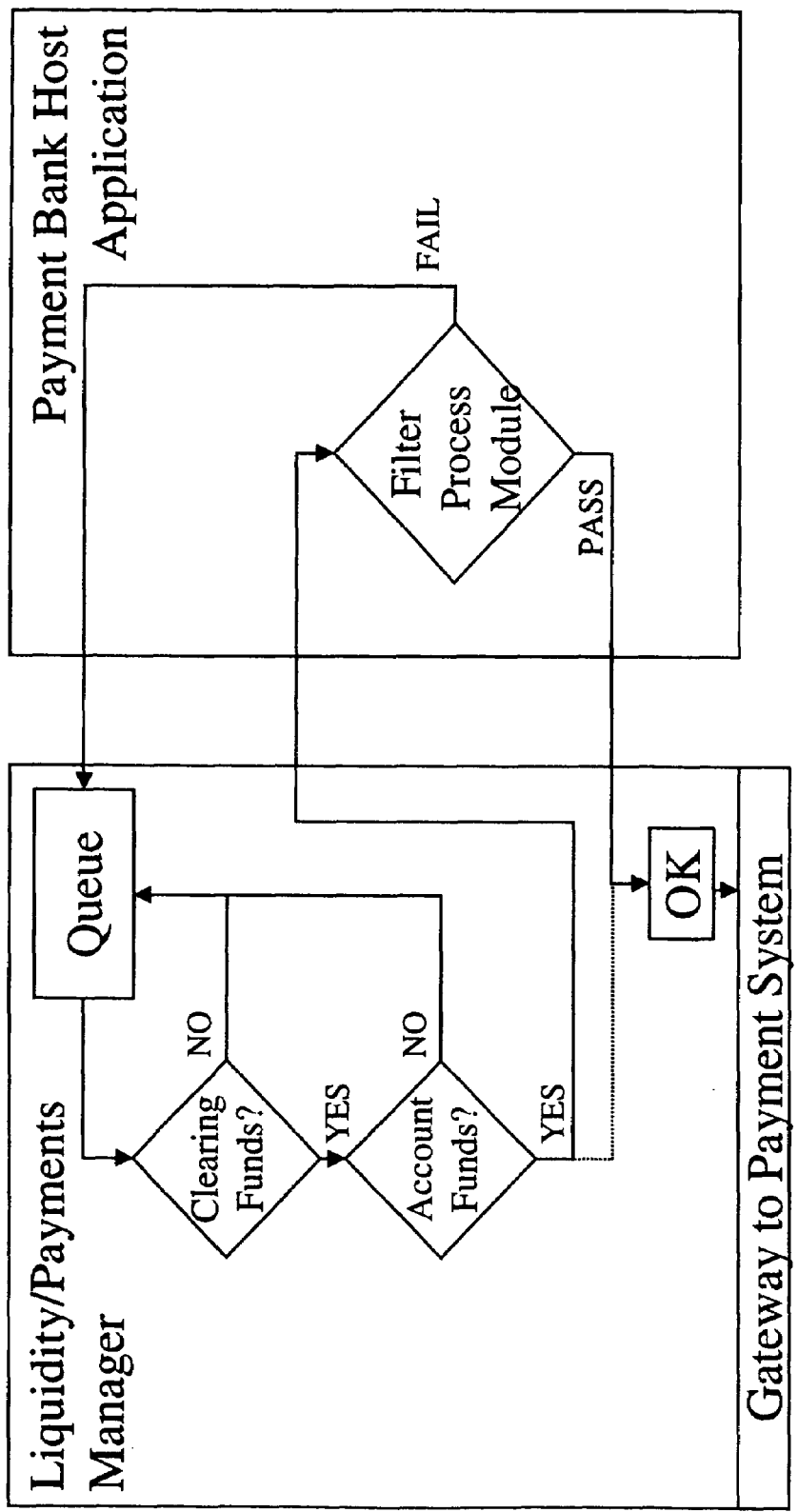
FIG. 9C is a schematic representation of the modular nature of the Filter Process in the Payment Bank Host Application, acting as an adjunct to existing liquidity/payments management software operating within banks directly interfacing to domestic payment systems.

As shown in FIG. 9C, the Filter Process Module in the Payment Bank Host Application is intended to co-operate and be backward compatible with the existing liquidity and/or payments management software controlling the outflow of payments instructions to the domestic payment system. Liquidity/Payment Managers are software typically designed to evaluate individual payments messages against (a) the available balance overall for the bank in the domestic payment clearing account (generally an account held at the central bank for a real-time gross payment system), and (b) the available balance in the account of the account holder referenced in the payment instruction (the account to which a debit will be made for the payment). If a payment instruction fails either check, it is rejected back to the payments queue for re-evaluation later. Where a payment instruction clears these two parameterized evaluations, it is forwarded for payment through the gateway to the domestic payment system.

The Filter Process Module in the Payment Bank Host Application will be a modular extension of the parameterized evaluation already operating in the Liquidity/Payments Manager. Using an application-to-application interface which translates the data formats of the liquidity/payments manager to the data formats of the Filter Process Module, and back again, the two application modules can interoperate without retooling of the existing application. Payments clearing the assessments of the legacy Liquidity/Payments Manager will be forwarded to the Filter Process Module for assessment. If they fail such assessment, they are returned to the queue as before. If they pass, they are forwarded to the gateway to the domestic payment system as before. This modular integration with existing systems offers backward compatibility, providing lower integration costs and widespread adaptability of the GPM process.

As shown in FIG. 2D1 and 2D2, the Filter Process Module operates a logical algorithm for assessment of payments instructions. The process assumes that a payment instruction has been transmitted from the Liquidity/Payments Manager application within the Payment Bank's systems to the Filter Process Module for evaluation. As shown in FIG. 2D1, Step A of the Filter Process involves is to identifying the Payor on the payment instruction message. This will be possible using industry standard fields (e.g., Field 52A for an Ordering Institution, Field 50 for an Ordering Customer, or similar designations as pertain to domestic payment systems).

Step B of the Filter Process involves assessing whether the Payor is a User or Third Party using the GPM System. If NO, then the payment instruction is passed back to the liquidity/payment manager for transmission to the domestic payment system interface without further evaluation. If YES, then the Filter Process Module proceeds to Step C, identifying the Payee. The Payee will be the beneficiary of the payment instruction. This is designated using industry standard fields (e.g., Field 59 for a Beneficiary Customer, designated as the ultimate recipient of the funds being transferred).

Step D of the Filter Process involves assessing whether the Payee is a designated Counterparty as defined in received risk parameters. If the Payee identified is not a Counterparty for granular payments management, the payment instruction is passed back to the liquidity/payments manager for processing to the domestic payment system. If the Payee is a counterparty as defined in the risk parameters, then the Filter Process Module goes to Step E to determine whether the counterparty is suspended from further payments. If the Payee has been suspended, then all payments instructions will be rejected back to the payments queue until such time as the suspension may be lifted.

At Step F, the Filter Process Module identifies the payment type of the payment instruction under analysis. The default will be to subject all payment types to the Filter Process unless only specific payment types have been designated for processing. Thus if the payment type (e.g., MT200 or MT202) has been specifically designated for processing in the risk parameters (an optional specification) then it will be passed to Step F. If it has not been so designated, it will be passed back to the liquidity/payment software for further processing to the payment system.

This step can also be used to differentiate payment channels where there are more than one domestic payment systems. For example, the United States has two large value payments systems: Fedwire operated by the Federal Reserve System, and the Clearing House Interbank Payment System (CHIPS), operated cooperatively by the New York Clearing House Association. The payment type identifier in the risk parameters can be structured to reference the various payment channels (as alternative payment systems are known), so that, for example, payment instructions for Fedwire would be subjected to the Filter Process but payment instructions for CHIPS would not. (Where separate liquidity/payments managers operate for separate payment channels, the Filter Process Module could be installed in multiple instances within the Payment Bank, achieving the same objective.) Where the payment instruction is eligible for the Filter Process at Step G, the Filter Process identifies the payment amount from the payment instruction at Step H (e.g., Field 32A on a S.W.I.F.T. message type).

Step I of the Filter Process Module involves calculating the Available Balance for the counterparty. This involves a process explained fully below.

Step J of the Filter Process involves comparing the Available Balance against the payment amount. Where the Available Balance exceeds the payment amount, the payment instruction is passed back to the liquidity/payments manager for further processing. Where the payment amount exceeds the Available Balance, the instruction is rejected back to the payments queue, and the liquidity/payments manager notified accordingly.

Finally, at Step K of the Filter Process, the Available Balance is reduced by the amount of any payment and stored.

As shown in FIG. 9E1 and FIG. 9E2, the Available Balance is calculated using a logical algorithm with seven steps. Step I.1 is to identify the User or Third Party (as done in Step A of the Filter Process). Step I.2 is to identify the Counterparty (as done in Step B of the Filter Process). Step I.3 is to identify the stored Available Balance. This amount will be either (a) the Clean Payment limit at the beginning of payments processing for the day, (b) the stored Available Balance as revised during Step K of the Filter Process, or (c) the stored Available Balance as revised by receipt of amended Risk Parameters specifying a change to the Clean Payment Limit.

At Step I.4, the process for calculating the Available Balance sends a timestamped inquiry to the payments/liquidity manager or other appropriate application to determine whether incoming payments have been received designating the User or Third Party under consideration as a beneficiary since the last timestamped request. If so, the amounts of any such payments are totaled (Step I.5) and added to the Available Balance (Step I.6). The recalculated Available Balance is stored and forwarded (Step I.7) to the Filter Process in fulfillment of Step I of that process.

As shown in FIG. 9F1, the same process used for generating and sending risk parameters can also be used to generate and send instructions to suspend all payments to a particular Counterparty. The GPM System will enable a User (or Third Party via a User) to suspend all further payments to a designated Counterparty in one, several or all currencies with an instantaneous instruction. The Third Party (4) or User Host Application (1) initiates the process of suspension. Using the browser interface to the host application, the User or Third Party selects the Counterparty (from a drop down list), selects the currencies for which suspension is sought (from a drop down list) and then clicks on a button generate a Suspend Instruction. The application will ask the User or Third Party to confirm the instruction according to its terms as a precaution appropriate to so serious an intervention in the payments process. Where the Suspend Instruction is confirmed, it is sent via the GPM Network to the GPM Core System (Step A on FIG. 9F1).

The GPM Core System identifies Payment Banks for receipt of the Suspend Instruction acting for the User in the affected currencies. The Core System then routes the Suspend Instruction via the GPM Network to the Payment Bank Host Application (3) (Step B on FIG. 9F1). The Payment Bank Host Application sets the trigger in the Filter Process to determine that the Counterparty has been suspended (Step C on FIG. 9F1). When a payment instruction for the Counterparty comes through the Filter Process, it will be rejected and returned to the payments queue (Step E on FIG. 9D1 and FIG. 9D2). As a result, no payments for that Counterparty will be permitted until the trigger is reset to remove the suspension (in the event the Counterparty is reinstated).

Once the trigger in the Filter Process has been set to Suspended for a Counterparty, the Payment Bank Host Application generates an automated notification to confirm implementation of the Suspend Instruction (Step D on FIG. 9F1). The notification is passed through the GPM Core System back to the User (Step E) and Third Party, if any (Step F), where the confirmation of the Suspend Instruction is notified as an alert and stored.

The process of the present invention described hereinabove represents a very important advance in the control of payments risk during a default crisis. In many countries, the legal system applying in bankruptcy allows for the unwinding of payments which are made after an insolvency petition is filed or, in some countries, all payments occurring on the date of an insolvency from midnight onwards. As a result, the unwinding process can result in great dislocation to payments systems, resulting in unquantifiable payments risk, liquidity risk and systemic risk. The earlier a party to a transaction can intervene to prevent further payments, the better. The GPM System presents a significant innovation in enabling a participant to suspend payments in all currencies for a counterparty from the moment he first learns of a default or insolvency situation, while at the same time allowing the participant to know exactly the extent of his payment risk and liquidity risk in each currency (the Clean Payment Limit).

The Suspend Instruction will remain a bar to all further payments in the Filter Process until processing is reinstated. Reinstatement is achieved by the simple mechanism of sending a new Risk Parameter Instruction referencing the suspended Counterparty. When received by the Filter Process, the suspension trigger is reset and the new risk parameters are implemented in Filter Process logic.

As shown in FIG. 9F2, the Suspension Instruction message fields will simply identify the Third Party and/or User originating the Suspend Instruction, the Payment Bank addressed by the Suspend Instruction, the Counterparty suspended, and the nature of the instruction as a Suspend Instruction.

As shown in FIG. 9F3, the steps alluded to in FIG. 9F1 can be detailed within the process for the Third Party or User Host Application, the GPM Core System and the Payment Bank Host Application. Together, the processes provide an effective and secure means of rapidly suspending payments to a Counterparty where there are reasonable grounds for fearing that the Counterparty is insolvent or otherwise incapable of performing his obligations.

Method of Using the GPM System of the Present Invention

Having described the illustrative embodiment of the GPM System hereof, it is appropriate at this juncture to describe a preferred method of using the same.

Opening an Account with GPM

Each entity involved in the GPM System, whether User, Third Party, Payment Bank or Counterparty will have a Unique Identifier (UID). For Payment Banks and many Users, this will be their BIC code. Other Users and Third Parties may have a unique industry standard identifier of another sort, which can be used by the GPM System. Otherwise, the GPM System will issue its own unique identifier in a format analogous to the BIC code. The unique identifier will enable the GPM System to track an entity's involvement in the system, regardless of the nature of its role in any particular system action.

Users

Each User will have at least one account within the GPM System. Each account can support one or more User or Third Party identities, or a combination thereof. Users may flexibly identify themselves, affiliates or others as Users or Third Parties such that various hierarchies of corporate affiliates, branches, clients and other sub-groupings are separately accounted for within the GPM System. Users may reflect their organizational and administrative hierarchy by identifying Users or Third Parties as they choose, including providing client identifiers used in their internal systems, and may create various account hierarchies for aggregation or disaggregation of risk management and reporting.

In the illustrative embodiment, Users will seek to open an account on-line via a Website maintained on the World Wide Web or other Web(s) by the GPM System. If accepted on review, the GPM System will automatically issue account identifiers to Users as accounts are opened in the system. GPM operations personnel shall issue, modify and manage customer account creation, deletion and security features, including user logins, passwords, and authorization verification procedures in connection with access privileges for each employee within a User.

In addition, the GPM System will make use of global digital certification. Each User will require issuance of a digital certificate as part of the User acceptance process. Each session with the GPM System thereafter will begin with verification of the digital certificate details with the digital certification authority.

The GPM System will identify each User or Third Party account separately, but many Users may wish to aggregate an account hierarchy to promote more efficient liquidity and/or risk management in connection with their payments activities. Users may elect to create one or more "synthetic" accounts representing an aggregation of User and/or Third Party accounts. By way of example, a foreign exchange dealer may wish to create individual Third Party accounts for each client for which the dealer acts in negotiation and settlement of foreign exchange transactions. However, in order to manage his liquidity and payments risk across the range of client accounts, he may elect to aggregate the accounts into a single master account.

User details necessary for the management and billing will be stored on the GPM Data Server. These details will include, but are not limited to account name, company name, contact name, address, telephone number, facsimile number, e-mail address, account number, billing information, and communication information.

All User access will be protected through a User-based access/entitlement security mechanism including digital certification. Only properly authorized Users will have the ability to instigate GPM System actions, including creating and modifying Third Party, User and counterparty details, entering or modifying Net Payment Limits, entering or modifying Risk Parameters, instructing Suspend Instructions for suspension of further payments, and creating or altering report formats, or generate messaging, inquiries, and other system actions.

On an ongoing basis, the GPM System maintains records of User access and usage of the GPM System, and Users will have access to these records by way of inquiry and report facilities.

Payment Banks

Each Payment Bank will have at least one account within the GPM System. A Payment Bank account will be identified by its BIC code, although the same entity may have other accounts as a User. Banks may have multiple accounts as Payment Banks so long as each is associated with a different BIC code (e.g., where the bank has branches participating in different domestic payment systems worldwide).

GPM operations personnel shall issue, modify and manage Payment Bank account creation, deletion and security features, including user logins, passwords, and authorization verification procedures in connection with access privileges for each employee within a Payment Bank.

Payment Bank connection to the GPM System will also make use of global digital certification. Each Payment Bank will require issuance of a digital certificate as part of the acceptance process. Each session with the GPM System thereafter will begin with verification of the digital certificate details with the digital certification authority.

Payment Bank details necessary for the management and billing will be stored on the GPM Data Server. These details will include, but are not limited to account name, company name, contact name, address, telephone number, facsimile number, e-mail address, account number, billing information, and communication information.

All Payment Bank access will be protected through a Payment Bank-based access/entitlement security mechanism including digital certification. Only properly authorized Payment Bank employees will have the ability to instigate GPM System actions, including management of User relationships, creating or altering report formats, and generating notifications, messaging, inquiries, and other system actions.

On an ongoing basis, the GPM System maintains records of Payment Bank access and usage of the GPM System, and Payment Banks will have access to these records by way of inquiry and report facilities.

Creating Counterparty Risk Parameters within the GPM System

Counterparties can be any entity with whom the User or Third Party has regular payments flows. Where a counterparty is not itself a participant in the GPM System, the counterparty will nonetheless be identified to the system by its BIC or UID.

The definition of counterparties will be an important element in risk control, as affiliated entities might be aggregated as a single counterparty for risk management purposes, even where each entity trades for its own account (e.g. geographically diverse branches of a single bank). The User will be able to define a counterparty for its own purposes as an aggregation of UIDs and/or BICs.

The GPM System of the illustrative embodiment facilitates flexibility in creating and modifying counterparty risk parameters for use in the GPM System. Where a User elects human interaction, he can manually enter Risk Parameters via a browser interface to the User Host Application. Alternatively, he may translate a spreadsheet file into a file consistent with User Host Application formatting requirements. For fully automated processing, the User may have an application-to-application interface which automatically generates counterparty risk parameters for the GPM System from data and processes in his internal back-office systems.

Where a User is setting counterparty risk parameters manually, they would select a counterparty from a drop-down list on the screen (with an option to add a new counterparty). On the next screen they would be presented with a table of currencies (with an option to add or delete particular currencies) and spaces for Clean Payment Limit.

The User can set counterparty parameters either by sending an individual instruction for a counterparty on-line, or by way of file upload at any time during a session.

Instances of the User Host Application for application-to-application interface may include a periodic automated initiation of connection to the GPM Core System with fully automated upload of data files for risk parameters.

GPM Filter Process Module Processing

The GPM System stores received data and messages from Users in the GPM Core System Data Server. The data and messages are validated for syntax and field validation. The Process Server then analyses the data, sorting counterparty instructions in the first instance according to the BIC of the Payment Bank. The data is then compiled for transmission to the Payment Bank Host Application.

The Payment Bank Host Application is configured to accept counterparty risk parameters as parameters for rule-based decisions in the Filter Process Module on whether to permit individual payments messages to proceed for payment to the domestic payment system or return the payment message back to the payment queue held on the Payment Bank's internal systems. Where a payment complies with risk parameters, it will be allowed to proceed for payment. Where a payment would breach the parameters, it is returned to the payment queue for later reassessment.

The Filter Process Module is acting in real-time to control User risk vis-a-vis the counterparty. It does this by using the data captured from incoming payments from the counterparty and outgoing payments to the counterparty to update the Available Balance calculated within the Filter Process Module about payment flows. Payments from a counterparty (e.g., reflected in the generation of an MT 910) add to the Available Balance for outgoing payments. Outgoing payments (e.g., reflected in the generation of an MT 900) detract from the Available Balance. Because the payments messages use standard data formats and identifiers for banks and account holders, these data fields can be captured and interpreted consistently to populate the calculations in the Filter Process Module in conformity with a large number of domestic payment systems.

The Payment Bank Host Application will maintain a log of payments activities. This will enable flexible compilation of reports on either a periodic or on-demand basis. At the end of the day, summary information about the day's activities will be transmitted to the GPM Core System as part of the log-off process.

Exceptions Processing

Where the Payments Bank Host Application has rejected payments to a particular counterparty for some pre-defined period of time (e.g., half-hour), it will automatically generate a notification to alert the Payment Bank and the User to the potential problem. Either or both may then request a report of payments activities concerning the counterparty be generated by the Payment Bank Host Application.

Very often a User will want to initiate inquiries with a counterparty who has failed to make timely payment as expected. If the counterparty is also a User or Third Party within the GPM System, the User receiving an exception notification can initiate an inquiry through on-line messaging to the User or Third Party. (Third Party messaging will be routed through the Third Party's designated User.)

Overriding Payments Filter

There may be instances where a Payment Bank will wish to override the Payments Bank Host Application to enable a payment to proceed to the domestic payment system despite its failure to pass all risk parameters. If so, the Payment Bank will access the Payment Bank Host Application via a browser interface. It will identify the payment it wishes to act on from the log of rejected payments. It can then instruct the Filter Process Module to override the parameters for that payment the next time it is processed, enabling the payment to go forward to the domestic payment system.

Suspending a Counterparty

If on investigation the Third Party or User is inclined to believe that a counterparty is in difficulty and at risk of default, or indeed is subject to an insolvency action, the Third Party or User may wish to suspend further payments in order to reduce any credit exposure to the counterparty. To do this the Third Party or User will access the browser interface for the Third Party or User Host Application, bring up the counterparty from a drop down list, and click on a button for "suspend payments". This button will lead to a screen displaying all the currencies dealt with for that counterparty. The Third Party or User then has the option of selecting individual currencies or pressing a button for "select all". Once the currencies are selected according to the User's discretion, he will click a button labeled "send Suspend Instruction". He will be asked to confirm whether he really wants to suspend further payments to the counterparty, with a yes or no option. If he clicks the "yes" button, the instruction to suspend payments will be sent to all Payment Banks acting for the User.

When the Payment Bank Host Application receives a Suspend Instruction referencing a counterparty, the Filter Process Module will automatically engage a trigger to reject further payments messages, regardless of compliance with risk parameters. The Payment Bank Host Application will generate a notification to the Payment Bank of the implementation of a Suspend Instruction. The Payment Bank still has the discretion to override the Payment Bank Host Application to release individual payments should it determine to do so despite the effectiveness of the Suspend Instruction.

Inquiries, Reports and Messaging

Risk reduction and control are enhanced in the GPM System by the provision of flexible real-time and periodic mechanisms for inquiries, reports and messaging. Any participant in the GPM System (Third Party, User or Payment Bank) will be able to send messages to any other participant in real-time, using standard e-mail capabilities integrated into the GPM System. Inquiries can be structured as automated processes where the data sought by a User or Payment Bank can be obtained in an automated manner from the Payment Bank Host Application. Reports to participants on GPM System usage will be generated on an on-demand and periodic basis covering a variety of parameterized matters. These are likely to include: counterparty gross payments total, counterparty risk parameters, GPM risk reduction metrics, liquidity and efficiency of payments metrics, and other matters determined by the participants to be of interest. Participants will be able to structure reports to aggregate a variety of User accounts, Third Party accounts and counterparties, as required to form a consolidated view for their own risk management and regulatory reporting needs.

Audit Trail

The GPM System will maintain a comprehensive audit trail within the GPM Core System Data Server of all system actions such that all actions can be reviewed for audit, regulatory and recovery purposes. The GPM Operations Workstation will be able to access the audit trail via the operator's browser interface to the system.

Advantages of the Present Invention

Figure 10:
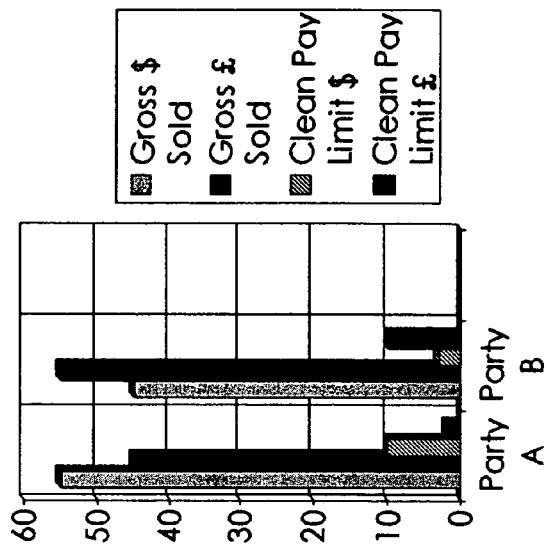
FIG. 10 is a graphical representation demonstrating the advantages of the present invention for reducing and controlling levels of payment risk as between two counterparties both using the GPM System of the present invention.

As shown in the graph of FIG. 10, the GPM System of the present invention provides simple and effective risk reduction with great advantages over all prior art systems hitherto known. The accompanying graph is an illustrative example of the effect of risk management as between two market counterparty Users of the GPM System of the present invention (although only one needs to use GPM for it to be effective). In this example, Party A and Party B have entered into a plurality of transactions throughout a trading day resulting in a portfolio of trades. The graph shows the gross amounts which must be paid in settlement of these trades such that Party A must pay $55M worth of US dollars and $45M worth of Euro at market prices. Party B must pay $55M of Euro and $45M worth of US dollars to settle its gross obligations under the same portfolio of transactions. (All amounts are measured in US dollars for convenience of reference.) As a result, each party must pay the gross amount of $110M. In the current system, payments to this amount would be made without any assurance of receiving the counterpayments of $110M value expected from the counterparty to the transactions. As a result, each party would undertake payment risk and liquidity risk of $110M on the other for that day's settlements.

Under the GPM System of the present invention, however, each party sets his own Clean Payment Limit for each currency. In this example, Party A has set the Clean Payment Limit in US dollars at $10M, while Party B has set it lower at $3M. Party B's risk on Party A is therefore lower than Party A's risk on Party B, consistent with individual risk assessment and the extent of the payment obligations. In Euro, Party B has set his Clean Payment Limit at $10M, consistent with his net payment obligation, and Party A has set his Clean Payment Limit at $2M, perhaps reflecting the greater difficulty of financing liquidity in Euro rather than a poor assessment of Party B's credit. The total payment risk for each party is reduced to their net payment obligation in the sold currency and the Clean Payment Limit in the bought currency. (The real measure may well be substantially less if the amount of the Net Payment Limit has been offset by receipts of payments in other payment systems in earlier time zones prior to a default.) In the illustrated example, the gross payment risk of $110M has been reduced to $12M for Party A and $13M for Party B.

The amounts set for Clean Payment Limits are within the discretion of Third Parties and Users, but some guidance and good practice are likely to emerge relatively quickly. As a rule, the Clean Payment Limit should equal or exceed the greater of the net payment amount in a currency (if any) or the single largest gross payment. If participants follow this guidance, then the GPM System will promote improved liquidity in payments systems by ensuring that payments liquidity flows to those making payments in a timely and sensible manner.

Other Uses and Modifications

Many aspects of the present invention relate to participant interface techniques for generating, storing, accessing and communicating information, data or messages which need not relate solely to payments or even financial transactions alone, but could relate to the controlled or balanced allocation of other resources.

While the illustrative embodiment of the GPM System described above will have many applications to the financial industry, it is understood that various modifications thereto will occur to those with ordinary skill in the art. However, all such modifications and variations are deemed to be within the scope and spirit of the present invention as defined by the accompanying Claims to Invention.

What is claimed is:

1. A computer-implemented method of reducing risk in a payment-based transaction, comprising:
   receiving at least one user-supplied risk parameter associated with a counterparty;
   receiving a first instruction authorizing the payment-based transaction from an account holder to the counterparty;
   storing the first instruction in a payment queue that is maintained in a memory device of a payment bank system operated by a payment bank; and
   determining the processing of the payment-based transaction by executing a risk filter routine, including:
      determining an available balance associated with the counterparty based upon the at least one user-supplied risk parameter, other payment-based transactions initiated by the account holder, and payments received by the account holder;
      reading the first instruction from the payment queue;
      determining whether to selectively reject the payment-based transaction based upon whether an amount of the payment-based transaction exceeds the available balance and based upon the at least one user-supplied risk parameter; and
      automatically returning the first instruction to the payment queue for later re-evaluation based upon payments received by the account holder from the counterparty subsequent to the determining whether to selectively reject the payment-based transaction if the amount of the payment-based transaction exceeds the available balance.

2. The computer-implemented method of claim 1, further comprising: generating the at least one user-supplied risk parameter on a user system and communicating the at least one user-supplied risk parameter to the risk filter routine.

3. The computer-implemented method of claim 1, wherein the available balance is computed over a given time period based upon payment-based transactions made by the account holder during the given time period and payments received by the account holder during the given time period.

4. The computer-implemented method of claim 3, further comprising:
   receiving user-supplied updates to the at least one user-supplied risk parameter; and
   updating the available balance according to the user-supplied updates.

5. The computer-implemented method of claim 4, further comprising: generating the user-supplied updates on a user system and communicating the user-supplied updates to the risk filter routine.

6. The computer-implemented method of claim 3, further comprising:
   receiving a debit update based upon payment-based transactions made by the account holder during the given time period;
   receiving a credit based upon payments received by the account holder during the given time period; and
   updating the available balance based upon the debit update and the credit update.

7. The computer-implemented method of claim 6, wherein the debit update and credit update are received through a data interchange with a payments confirmation service.

8. The computer-implemented method of claim 1, wherein the risk filter routine interoperates with a plurality of payment channels for any given currency.

9. The computer-implemented method of claim 3, further comprising: receiving user-supplied updates to the at least one user-supplied risk parameter.

10. The computer-implemented method of claim 8, further comprising: generating the user-supplied updates on a user system and communicating the user-supplied updates to the risk filter routine.

11. The computer-implemented method of claim 1, wherein the risk routine is executed by a module integrated into the payment bank system.

12. The computer-implemented method of claim 1, wherein the risk filter routine is executed by a module operable to communicate with the payment bank system via an application-to application interface which translates data formats between the module and the payment bank system.

13. The computer-implemented method of claim 11, wherein the at least one user-supplied risk parameter is generated on a user system and is communicated to a central server, which is configured to store the at least one user-supplied risk parameter and to forward the at least one user-supplied risk parameter to the module.

14. The computer-implemented method of claim 1 wherein the risk filter routine interacts with other payment processing routines operated by the payment bank to determine whether to selectively reject the payment-based transaction.

15. The computer-implemented method of claim 1, wherein the risk filter routine interacts with a domestic payment system operated by the payment bank, such that the first instruction is filtered by the risk filter routine for compliance with a risk profile generated from the at least one user-supplied risk parameter.

16. The computer-implemented method of claim 1, wherein the risk filter routine is operable to control the flow of payment-based transaction clearance messages from the payment queue to a domestic payment system.

17. The computer-implemented method of claim 1, wherein the payment-based transaction is a Society for Worldwide Inter-bank Financial Transmissions (S.W.I.F.T.) payment transaction.

18. The computer-implemented method of claim 7, wherein the debit update and credit update are received via Society for Worldwide Inter-bank Financial Transmissions (S.W.I.F.T.) messages.

19. The computer-implemented method of claim 1, wherein the automatically returning the first instruction to the payment queue is performed without communicating with the counterparty.

20. The computer-implemented method of claim 1, further comprising: initiating the later re-evaluation of the first instruction without a re-evaluation request from the counterparty.

21. The computer-implemented method of claim 1, wherein the payment-based transaction is a foreign currency exchange transaction.

22. The computer-implemented method of claim 1, further comprising:
receiving an indication of the initiation of the other payment-based transaction by the account holder.

23. The computer-implemented method of claim 1, wherein the user-supplied risk parameter is at least one of an identity of a counterparty, a clean payment limit, and a payment type.

24. A computer-readable storage medium storing computer-readable instructions, that if executed, cause a first device to perform a plurality of operations, including:
receiving at least one user-supplied risk parameter associated with a counterparty;
receiving a first instruction authorizing a payment-based transaction from an account holder to a counterparty through a payment bank system of a payment bank;
storing the first instruction in a payment queue of the payment bank system; and
determining the processing of the payment-based transaction by executing a risk filter routine, including:
determining an available balance associated with the counterparty based upon the at least one user-supplied risk parameter, other payment-based transactions initiated by the account holder, and payments received by the account holder;
reading the first instruction from the payment queue;
determining whether to selectively reject the payment-based transaction based upon whether an amount of the payment-based transaction exceeds the available balance and based upon the at least one user-supplied risk parameter; and
automatically returning the first instruction to the payment queue for later re-evaluation based upon payments received by the account holder from the counterparty subsequent to the determining whether to selectively reject the payment-based transaction if the amount of the payment-based transaction exceeds the available balance.

25. The computer-readable storage medium of claim 24, wherein automatically returning the first instruction to the payment queue is performed without communicating with the counterparty.

26. The computer-readable storage medium of claim 24, wherein the operations further include initiating the later re-evaluation of the first instruction without a re-evaluation request from the counterparty.

27. The computer-readable storage medium of claim 24, wherein the payment-based transaction is a foreign currency exchange transaction.

28. An apparatus for reducing risk in payment-based transactions, comprising:
in a server:
a payment bank system configured to process a payment-based transaction wherein payment is made from an account holder to a counterparty, to receive at least one user-supplied risk parameter associated with the counterparty, to receive a first instruction authorizing the payment-based transaction, wherein the payment bank system includes:
a queue configured to store the first instruction and to forward the first instruction to a risk filter module; and
a risk filter module configured to: determine an available balance associated with the counterparty based upon the at least one user-supplied risk parameter, other payment-based transactions initiated by the account holder, and payments received by the account holder; receive the first instruction from the payment queue; determine whether to selectively reject the payment-based transaction based upon whether an amount of the payment-based transaction exceeds the available balance and the at least one user-supplied risk parameter; and automatically return the first instruction to the payment queue for later re-evaluation based upon payments received by the account holder from the counterparty if an amount of the payment-based transaction exceeds the available balance.

29. The apparatus of claim 28, wherein the risk filter module is further configured to automatically return the first instruction to the payment queue without communicating with the counterparty.

30. The apparatus of claim 28, wherein the risk filter module is further configured to initiate the later re-evaluation of the first instruction without a re-evaluation request from the counterparty.

31. The apparatus of claim 28, wherein the payment-based transaction is a foreign currency exchange transaction.

32. An apparatus for reducing risk in payment-based transactions, comprising:
means for receiving at least one user-supplied risk parameter associated with a counterparty;
means for receiving a first instruction authorizing a payment-based transaction from an account holder to a counterparty;
means for storing the first instruction in a payment queue; and
means for processing of the payment-based transaction, including:
means for determining an available balance associated with the counterparty based upon the at least one user-supplied risk parameter, other payment-based transactions initiated by the account holder, and payments received by the account holder;
means for determining whether to selectively reject the payment-based transaction based upon whether an amount of the payment-based transaction exceeds the available balance and based upon the at least one user-supplied risk parameter; and
means for automatically returning the first instruction to the payment queue for later re-evaluation based upon payments received by the account holder from the counterparty after selective rejection of the payment-based transaction.

33. The apparatus of claim 32, further comprising:
means for initiating the later re-evaluation of the first instruction without a re-evaluation request from the counterparty.

34. The apparatus of claim 32, wherein the payment-based transaction is a foreign currency exchange transaction.

* * * * *